US010382721B2

(12) United States Patent
Hasegawa

(10) Patent No.: US 10,382,721 B2
(45) Date of Patent: Aug. 13, 2019

(54) COMMUNICATION TERMINAL, COMMUNICATION SYSTEM, COMMUNICATION METHOD, AND NON-TRANSITORY COMPUTER-READABLE MEDIUM

(71) Applicant: Takashi Hasegawa, Tokyo (JP)

(72) Inventor: Takashi Hasegawa, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/838,450

(22) Filed: Dec. 12, 2017

(65) Prior Publication Data

US 2018/0167580 A1 Jun. 14, 2018

(30) Foreign Application Priority Data

Dec. 14, 2016 (JP) .................................. 2016-242125
Dec. 8, 2017 (JP) .................................. 2017-235814

(51) Int. Cl.
*H04N 7/15* (2006.01)
*H04L 12/18* (2006.01)
(Continued)

(52) U.S. Cl.
CPC .......... *H04N 7/15* (2013.01); *H04L 12/1818* (2013.01); *H04L 51/043* (2013.01);
(Continued)

(58) Field of Classification Search
CPC combination set(s) only.
See application file for complete search history.

(56) References Cited

U.S. PATENT DOCUMENTS

2004/0133641 A1* 7/2004 McKinnon ........ H04M 3/42365
709/204
2009/0168765 A1* 7/2009 Samdadiya ....... H04L 29/06027
370/352
(Continued)

FOREIGN PATENT DOCUMENTS

JP 2010-028506 2/2010
JP 2010-074199 4/2010
(Continued)

*Primary Examiner* — Phung-Hoang J Nguyen
(74) *Attorney, Agent, or Firm* — Oblon, McClelland, Maier & Neustadt, L.L.P.

(57) ABSTRACT

A communication terminal includes circuitry to accept designation of an attribute, receive attribute information of a plurality of destination candidates and presence information of the plurality of destination candidates, and transmit a first request to a first destination candidate. The first destination candidate is one or more of the plurality of destination candidates whose attribute information indicates the accepted attribute and whose presence information indicates a first presence. In response to receiving attribute information and presence information of a second destination candidate of the plurality of destination candidates after transmission of the first request, the circuitry further transmits a second request to the second destination candidate, based on a determination that the attribute information of the second destination candidate indicates the accepted attribute, and the presence information of the second destination candidate indicates the first presence.

11 Claims, 18 Drawing Sheets

(51) Int. Cl.
  *H04L 12/58* (2006.01)
  *H04L 29/06* (2006.01)
  *H04L 29/08* (2006.01)
  *H04L 29/12* (2006.01)

(52) U.S. Cl.
  CPC ........ H04L 61/1547 (2013.01); H04L 65/403 (2013.01); *H04L 12/1822* (2013.01); *H04L 67/24* (2013.01)

(56) References Cited

U.S. PATENT DOCUMENTS

| | | | |
|---|---|---|---|
| 2011/0282647 A1* | 11/2011 | Pastore | G06F 17/2836 704/4 |
| 2013/0036189 A1* | 2/2013 | Stevens, III | H04L 65/1006 709/217 |
| 2013/0278712 A1 | 10/2013 | Maeda et al. | |
| 2014/0303956 A1* | 10/2014 | Wilson | G06Q 10/06 704/2 |
| 2016/0099893 A1 | 4/2016 | Hasegawa et al. | |
| 2016/0112465 A1 | 4/2016 | Hasegawa et al. | |
| 2016/0162478 A1* | 6/2016 | Blassin | G06Q 10/06311 706/12 |
| 2016/0269327 A1 | 9/2016 | Hasegawa et al. | |
| 2017/0006146 A1 | 1/2017 | Homma et al. | |
| 2017/0034476 A1 | 2/2017 | Homma et al. | |
| 2017/0034698 A1 | 2/2017 | Homma et al. | |
| 2017/0083845 A1* | 3/2017 | Karcher | G06Q 10/06313 |
| 2017/0094224 A1 | 3/2017 | Hasegawa et al. | |
| 2017/0180912 A1 | 6/2017 | Shiro et al. | |
| 2017/0187990 A1 | 6/2017 | Hasegawa et al. | |
| 2017/0230472 A1 | 8/2017 | Hasegawa et al. | |
| 2017/0264671 A1 | 9/2017 | Homma et al. | |
| 2017/0272439 A1 | 9/2017 | Homma et al. | |
| 2017/0366667 A1* | 12/2017 | Cordell | H04M 3/4936 |

FOREIGN PATENT DOCUMENTS

| | | |
|---|---|---|
| JP | 2012-080179 | 4/2012 |
| JP | 2012-147416 | 8/2012 |

* cited by examiner

FIG. 7A  COUNTERPART MANAGEMENT TABLE

| CONTACT ID | PRESENCE | ATTRIBUTE INFORMATION |
|---|---|---|
| O01 | Chat | en, zh, es |
| O02 | Online | en, es, pt, ru, th |
| O03 | Online | en, ko, pt |

FIG. 7B  PRESENCE MANAGEMENT TABLE

| ATTRIBUTE INFORMATION | GROUP PRESENCE | CONTACT ID THAT IS AVAILABLE FOR CHATTING | CONTACT ID THAT IS CURRENTLY CHATTING |
|---|---|---|---|
| en | Online | O02, O03 | |
| zh | Chat | | |
| ko | Online | O03 | |
| pt | Online | O02, O03 | |
| es | Online | O02 | |
| th | Online | O02 | |
| ru | Online | O02 | |

FIG. 7C  DESTINATION MANAGEMENT TABLE

| DESTINATION OF START REQUEST (CONTACT ID) |
|---|
| O02 |
| O03 |
| ... |

FIG. 7D  AUTHENTICATION MANAGEMENT TABLE

| CONTACT ID | PASSWORD |
|---|---|
| C01 | aaaa |
| ... | ... |
| O01 | abab |
| ... | ... |

FIG. 7E  TERMINAL MANAGEMENT TABLE

| CONTACT ID | IP ADDRESS OF TERMINAL |
|---|---|
| C01 | 1.2.1.3 |
| ... | ... |
| O01 | 1.3.2.3 |
| ... | ... |

☐ LOGIN

CONTACT ID

O01

PASSWORD abab

SUPPORT LANGUAGE

☑ ENGLISH   ☑ CHINESE   ☐ KOREAN

☐ PORTUGUESE   ☑ SPANISH   ☐ THAI

☐ RUSSIAN

OK

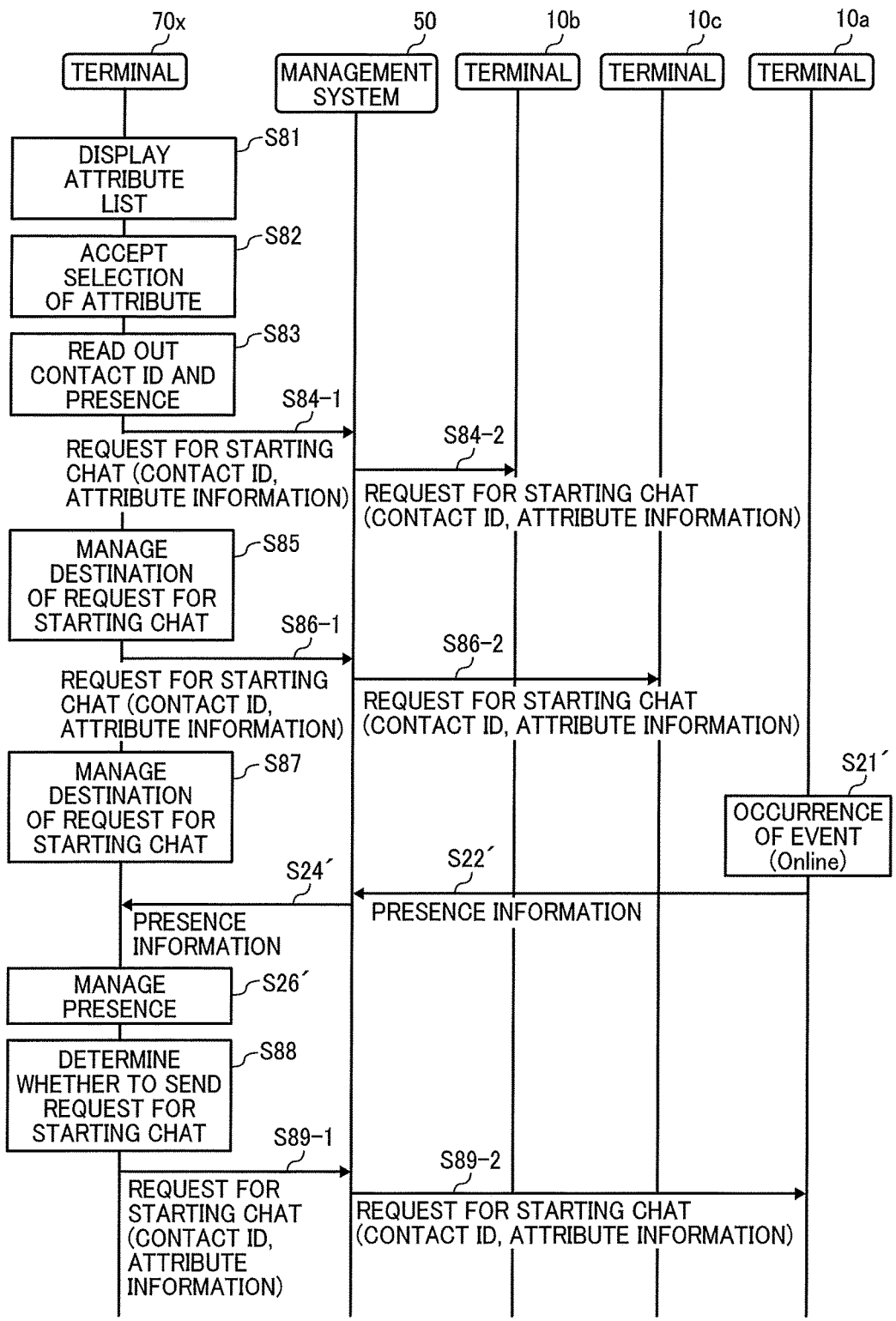

COMMUNICATION TERMINAL, COMMUNICATION SYSTEM, COMMUNICATION METHOD, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application Nos. 2016-242125, filed on Dec. 14, 2016 and 2017-235814, filed on Dec. 8, 2017, the entire disclosures of which are hereby incorporated by reference herein.

BACKGROUND

Technical Field

The present disclosure relates to a communication terminal, a communication system, a communication method, and a non-transitory computer-readable medium.

Description of the Related Art

Recently, various cloud services are provided, using communications among plural remote sites through a communication network such as the Internet. A videoconference conferencing service, which is one example of cloud services, is diverted to video translation services to meet increase of the demand for bilingual or multilingual communication. In the video translation service, a communication terminal of a user who wants to be served with translation and a communication terminal of a translator who is standby at a call center are connected with each other. This enables the user to use the translation service in real time, as if they are face-to-face, even they are at remote locations. In such applications, a call request specifying an attribute such as a translator capable of translating English is required, for example. In addition, protocols for communication such as Session initiation protocol for Instant Messaging and in Presence Leveraging Extensions (SIMPLE) has a presence notifying function, which enables a user to check whether the counterpart is present at the time of requesting a call.

Further, a communication terminal is known, which displays an icon indicating a state of a videoconference.

SUMMARY

A communication terminal includes circuitry to accept designation of an attribute, receive attribute information of a plurality of destination candidates and presence information of the plurality of destination candidates, and transmit a first request to a first destination candidate. The first destination candidate is one or more of the plurality of destination candidates whose attribute information indicates the accepted attribute and whose presence information indicates a first presence. In response to receiving attribute information and presence information of a second destination candidate of the plurality of destination candidates after transmission of the first request, the circuitry further transmits a second request to the second destination candidate, based on a determination that the attribute information of the second destination candidate indicates the accepted attribute, and the presence information of the second destination candidate indicates the first presence.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7A is an illustration of an example data structure of a counterpart management table managed at the communication terminal, according to an embodiment of the present disclosure;

FIG. 7B is an illustration of an example data structure of a presence management table managed at the communication terminal, according to an embodiment of the present disclosure;

FIG. 7C is an illustration of an example data structure of a destination management table managed at the communication terminal, according to an embodiment of the present disclosure;

FIG. 7D is an illustration of an example data structure of an authentication management table managed at the communication management system, according to an embodiment of the present disclosure;

FIG. 7E is an illustration of an example data structure of a terminal management table managed at the communication management system, according to an embodiment of the present disclosure;

FIG. 9 illustrates an example of an acceptance screen, according to an embodiment of the present disclosure;

FIG. 12 is a sequence diagram illustrating an example operation of starting communication, according to an embodiment of the present disclosure;

Figure 1:
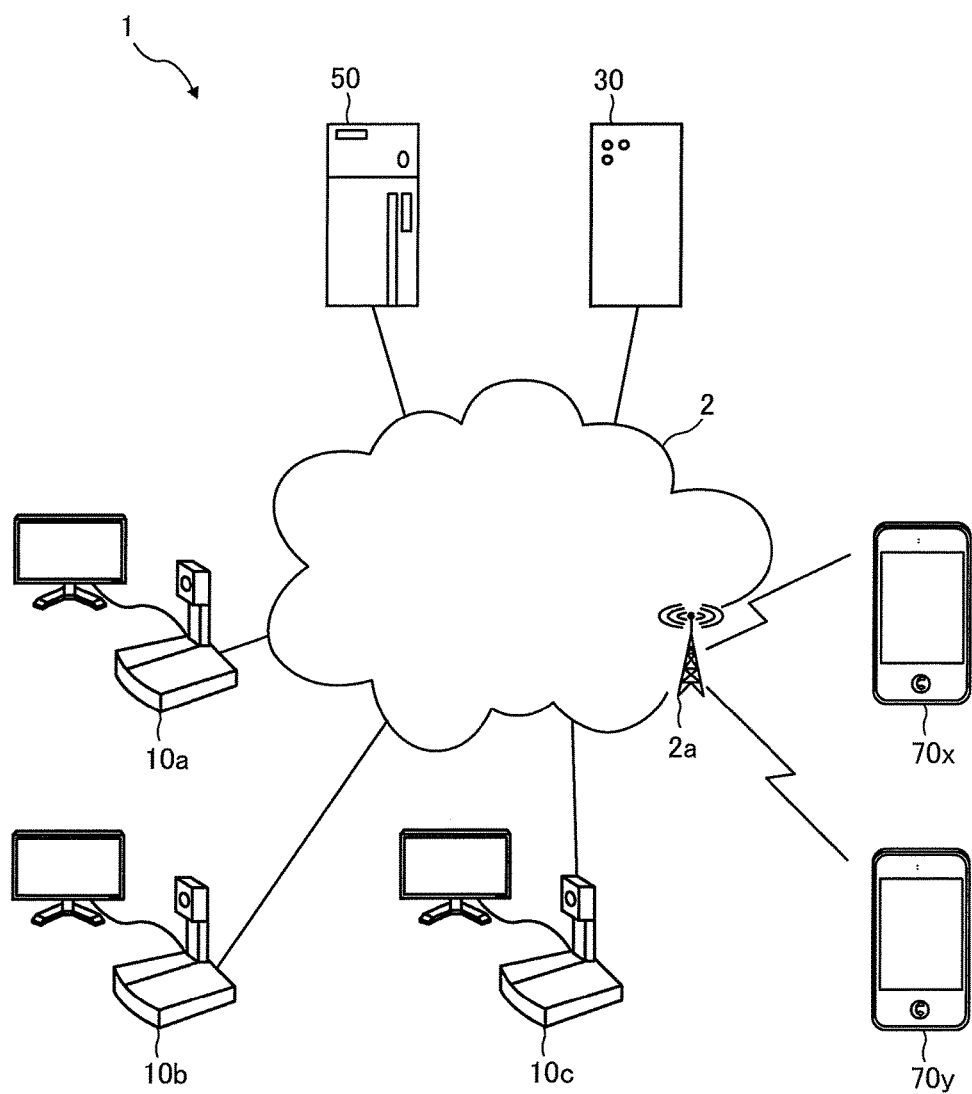
FIG. 1 is a schematic diagram illustrating a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

An embodiment of the present disclosure is described hereinafter with reference to drawings.

<<Schematic Configuration of Communication System 1>>

FIG. 1 is a schematic diagram illustrating a configuration of a communication system 1 according to an embodiment of the present disclosure. As illustrated in FIG. 1, the communication system 1 includes a plurality of communication terminals 10a, 10b, and 10c, a plurality of communication terminals 70x and 70y, a communication management system 50, and a relay apparatus 30. Examples of any one of the terminal 10a, the terminal 10b, and the terminal 10c include a videoconference terminal. Examples of any one of the plurality of communication terminals 70x and 70y include a smartphone. The communication management system 50 manages those communication terminals 10a, 10b, 10c, 70x, and 70y. In the following, a "communication terminal" may simply be referred to as a "terminal", and a "communication management system" may simply be referred to as a "management system".

Although FIG. 1 illustrates an example in which the communication system 1 includes three terminals 10a, 10b, 10c and two terminals 70x, 70y, there may be any suitable number of terminals. In this disclosure, an arbitrary one or ones of the plurality of terminals 70x and 70y is/are represented as a "terminal(s) 70". Further, an arbitrary one or ones of the plurality of terminals 10a, 10b, and 10c is/are represented as a "terminal(s) 10". Examples of the terminal 10 and terminal 70 include a general-purpose computer, an electronic whiteboard, a car navigation terminal, and an electronic signage (digital signage), each having communication capability.

The management system 50 is a computer having a server function. The terminal 10 and terminal 70 are each a computer having a corresponding client function. The terminal 10, the terminal 70, the relay apparatus 30, and the management system 50 are communicable with each other through a communication network 2 such as the Internet, a mobile phone network, a local area network (LAN), Wireless Fidelity (Wi-Fi), or Bluetooth (registered trademark).

The communication network 2 also includes a base station 2a at the end of the mobile phone network. Although FIG. 1 illustrates an example in which the communication system 1 includes a single base station 2a, there may be any suitable number of base stations.

The relay apparatus 30 relays content data such as sound data, video (image) data, text data, etc., among the terminals 10 and the terminals 70.

The terminal 10 is provided in a call center, which is an example of a site. The terminal 70 is provided at a front of a hotel, which is another example of the site. The management system 50, the relay apparatus 30, the terminals 10, and the terminals 70 may be located at any area, which may be the same to or different from that of the other terminal or apparatus is located. A user of the terminal 10 is, for example, an operator. A user of the terminal 70 is, for example, a customer.

<<Hardware Configuration of Embodiment>>

Figure 2:
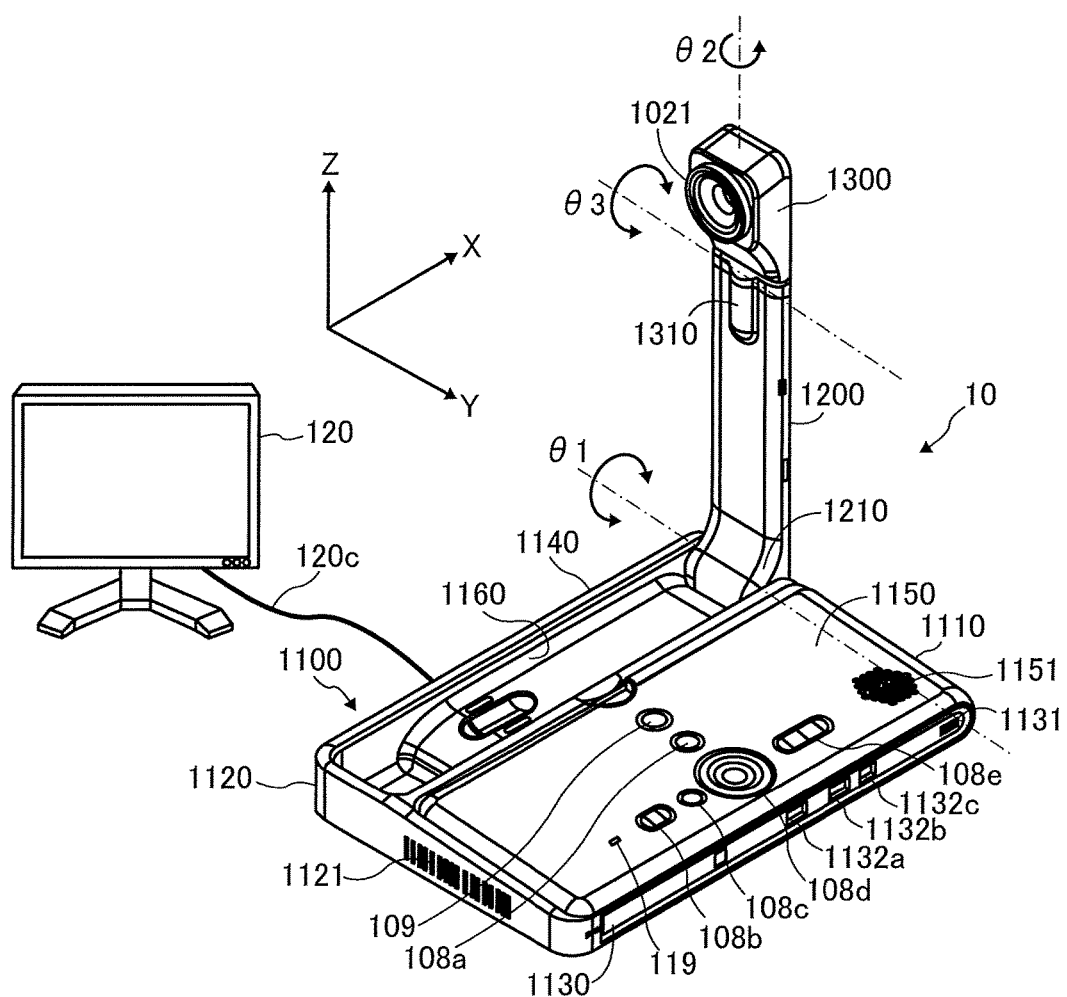
FIG. 2 is an external view of a communication terminal according to an embodiment of the present disclosure.

A description is given hereinafter of a hardware configuration according to the present embodiment. FIG. 2 is an external view of the terminal 10 according to an embodiment of the present disclosure. As illustrated in FIG. 2, the terminal 10 includes a casing 1100, an arm 1200, and a camera housing 1300. The casing 1100 includes a front side wall 1110 having a plurality of air intake holes formed over the nearly entire surface of the intake surface, and a back side wall 1120 having a plurality of exhaust holes over the nearly entire surface of an exhaust surface 1121. When a cooling fan included in the casing 1100 is driven, air behind the terminal 10 can be taken in via the intake surface and exhausted to the rear of the terminal 10 via the exhaust surface 1121. The casing 1100 further includes a right side wall 1130 formed with a sound pickup hole 1131. Through the sound pickup hole 1131, a built-in microphone 114, described later, is capable of picking up sound such as human voice or any sound including noise.

The casing 1100 has an operation panel 1150, which is provided at a front surface toward the right side wall 1130. The operation panel 1150 has a plurality of operation keys (108a to 108e) described later, a power switch 109 described later, and an alarm lamp 119 described later, which are formed thereon. The operation panel 1150 further has a sound output face 1151 formed thereon, which is formed of a plurality of sound output holes for allowing output sound from a built-in speaker 115 described later to pass through. The casing 1100 further includes a holder 1160, which is provided at the front surface toward the left side wall 1140. The holder 1160, which has a concave shape, accommodates therein the aim 1200 and the camera housing 1300. The right side wall 1130 of the casing 1100 is further provided with a plurality of connection ports 1132a to 1132c ("connection ports 1132"). The connection ports 1132 electrically connect cables to an external device connection interface (IT) 118 described later. Further, the left side wall 1140 of the casing 1100 is provided with a connection port for electrically connecting a cable 120c for a display 120 to the external device connection I/F 118.

In the following description, an arbitrary one or ones of the operation keys 108a to 108e is/are referred to as an "operation key(s) 108". In addition, an arbitrary one or ones of the connection ports 1132a to 1132c is/are referred to as a "connection port(s)" 1132.

The arm 1200 is attached to the casing 1100 via a torque hinge 1210. With the torque hinge 1210, the arm 1200 can be rotated in directions of up and down with respect to the casing 1100, while making a tilt angle θ1 of up to 135 degrees. FIG. 2 illustrates an example state in which the tilt angle θ1 is 90 degrees. The camera housing 1300 has a built-in camera 112 provided thereon, which is described later. The camera 112 captures an image of an object, such as a user, a document, or a room where the terminal 10 is located. The camera housing 1300 is provided with a torque hinge 1310. The camera housing 1300 is attached to the aim 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to 45 degrees in the direction of up and down. In FIG. 2, the pan angle θ2 and the tilt angle θ3 are each 0 degree.

The external view of FIG. 2 is just an example, and the terminal 10 may have any suitable appearance. The terminal 70, the relay apparatus 30, and the management system 50 each have the same appearance as that of a general-purpose smartphone or a general-purpose server computer. Accordingly, a description of the appearance thereof is omitted.

Figure 3A:
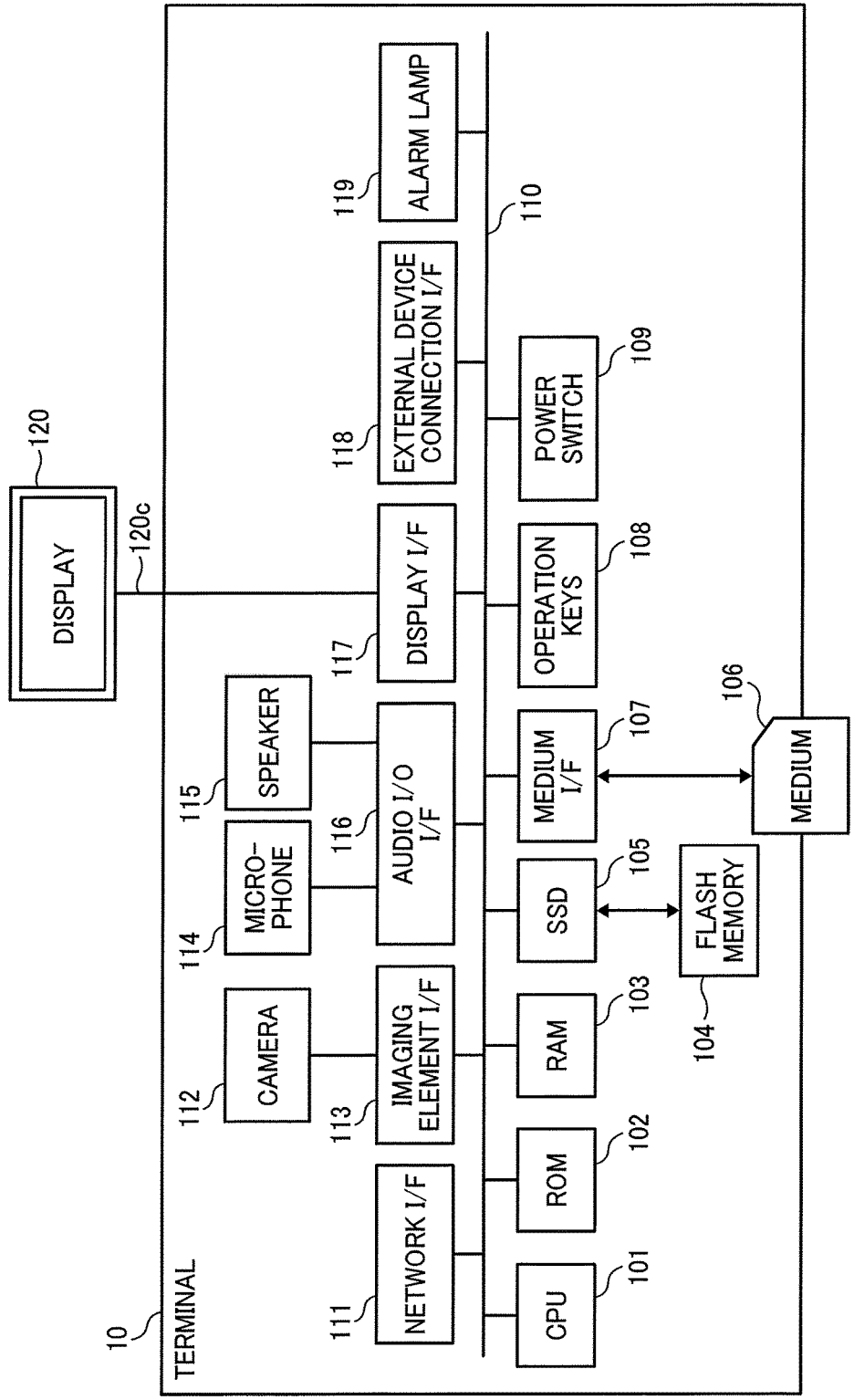
FIGS. 3A and 3B are schematic block diagrams, each illustrating a hardware configuration of the communication terminal according to an embodiment of the present disclosure.

FIG. 3A is a schematic block diagram illustrating a hardware configuration of the terminal 10 according to an embodiment of the present disclosure. The terminal 10 includes a central processing unit (CPU) 101, a read-only memory (ROM) 102, a random-access memory (RAM) 103, a flash memory 104, a solid state drive (SSD) 105, a medium I/F 107, the operation keys 108, the power switch 109, and a network I/F 111 The CPU 101 controls entire operation of the terminal 10. The ROM 102 stores a program used for driving the CPU 101, such as an initial program loader (IPL). The RAM 103 is used as a work area for the CPU 101. The flash memory 104 stores various types of data, such as a control program for the terminal 10, image data, and sound data. The SSD 105 controls reading/writing of various types of data from/to the flash memory 104 under control of the CPU 101. The medium I/F 107 controls reading/writing of data from/to a storage medium 106 such as a flash memory or an integrated circuit (IC) card. The operation keys 108 are operated to, for example, select a counterpart terminal of the terminal 10. The power switch 109 turns on and off the power of the terminal 10. The network I/F 111 transmits data using the communication network 2.

The terminal 10 further includes the built-in camera 112, an imaging element I/F 113, the built-in microphone 114, the built-in speaker 115, an audio input/output I/F 116, a display I/F 117, an external device connection I/F 118, the alarm lamp 119, and a bus line 110. The built-in camera 112 captures an image of a subject and obtains image data under control of the CPU 101. The imaging element I/F 113 controls driving of the camera 112 The built-in microphone 114 receives an audio input. The built-in speaker 115 outputs sounds. The audio input/output I/F 116 processes inputting/outputting of a sound signal between the microphone 114 and the speaker 115 under control of the CPU 101. The display IN 117 transmits image data to the external display 120 under control of the CPU 101. The external device connection I/F 118 connects various external devices. The bus line 110 electrically connects those hardware elements, as illustrated in FIG. 3A. Examples of the bus line 110 include an address bus and a data bus.

The display 120 displays an image of a subject or the like. Examples of the display 120 include a liquid crystal display (LCD) and an organic electroluminescence (EL) display. The display 120 is connected to the display IN 117 by the cable 120c. The cable 120c may be an analog red green blue (RGB) (video graphic array (VGA)) signal cable, a component video cable, a high-definition multimedia interface (HDMI (registered trademark)) signal cable, or a digital video interactive (DVI) signal cable.

The camera 112 includes a lens and a solid-state imaging element that converts an image (video) of a subject to electronic data by converting light to electric charge. As the solid-state imaging element, a complementary metal oxide semiconductor (CMOS) or a charge-coupled device (CCD) is used, for example.

The external device connection I/F 118 is capable of electrically connecting an external device such as an external camera, an external microphone, or an external speaker by using a Universal Serial Bus (USB) cable that is inserted into the connection port 1132 of the casing 1100. In the case where an external camera is connected, the external camera is driven under control of the CPU 101. Similarly, in a case where an external microphone is connected or an external speaker is connected, the external microphone or the external speaker is driven under control of the CPU 101.

The storage medium 106 is removable from the terminal 10. In addition to or instead of the flash memory 104, any suitable nonvolatile memory, such as an electrically erasable and programmable ROM (EEPROM), may be used, provided that it reads or writes data under control of CPU 101.

Figure 3B:
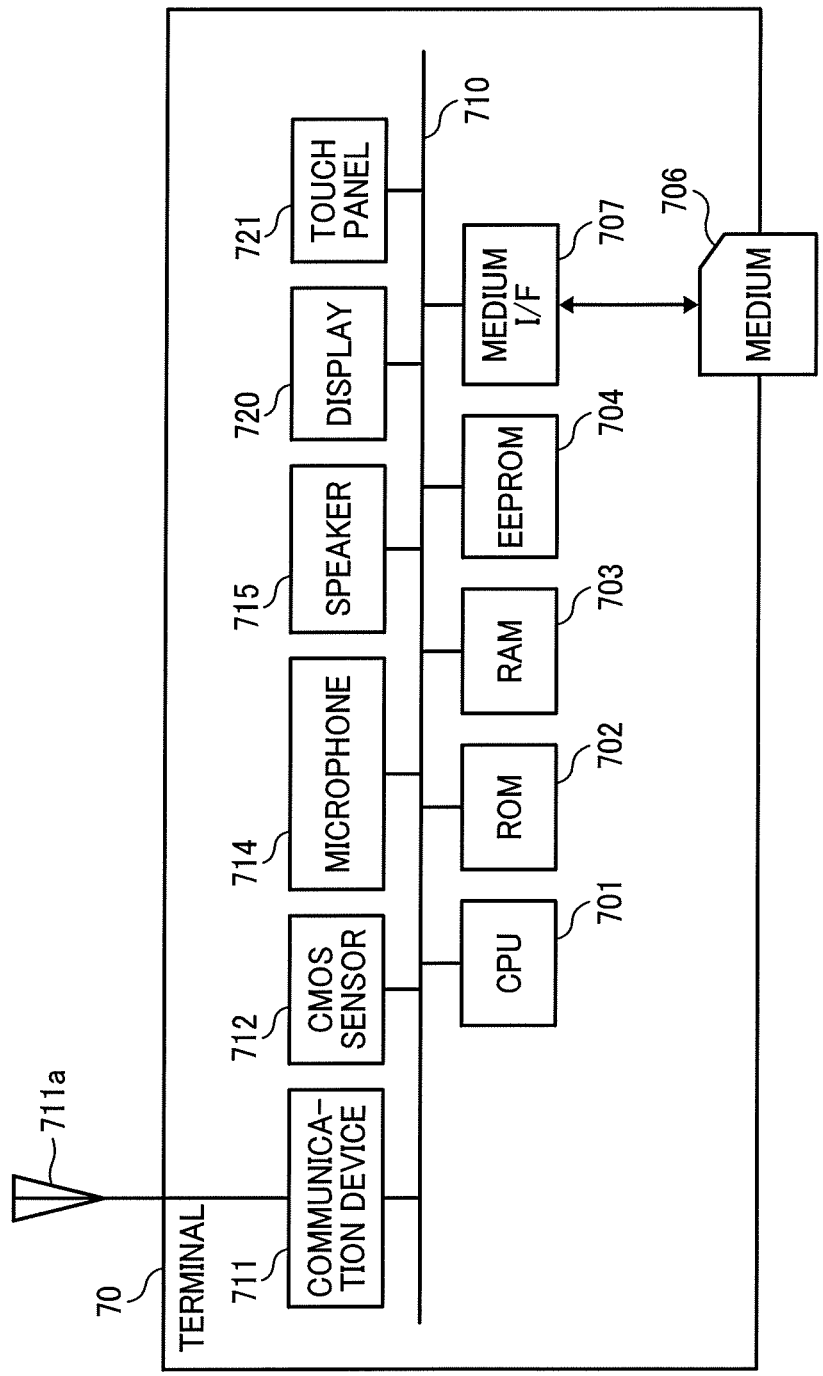

FIG. 3B is a schematic block diagram illustrating a hardware configuration of the terminal 70, according to an embodiment of the present disclosure. As illustrated in FIG. 3B, the terminal 70 includes a CPU 701, a ROM 702, a RAM 703, an EEPROM 704, a medium I/F 707, and a CMOS sensor 712. The CPU 701 controls entire operation of the terminal 70. The ROM 702 stores various types of programs. The RAM 703 is used as a work area of the CPU 701. The EEPROM 704 reads or writes data under control of the CPU 701. The medium I/F 707 controls reading or writing (storing) of data to/from a storage medium 706 such as a flash memory. The CMOS sensor 712 captures an image of a subject and obtains image data under control of the CPU 701.

The EEPROM 704 stores an operating system (OS) for execution by the CPU 701, other programs, and various data. The CMOS sensor 712 is a charge coupled device that converts an image of a subject into electronic data through photoelectric conversion. A charge-coupled device (CCD) may be used in place of the CMOS sensor, provided that it is capable of capturing an image of a subject.

Further, the terminal 70 includes a microphone 714, a speaker 715, an antenna 711a, a communication device 711, a display 720, a touch panel 721, and a bus line 710. The microphone 714 converts sound into a sound signal. The speaker 715 converts a sound signal into sound. The communication device 711 communicates with a nearest base station 2a by radio communication signals using the antenna 711a. The display 720 displays an image of a subject, various kinds of icons, or the like. Examples of the display 720 include an LCD or an organic EL display. The touch panel 721 is mounted on the display 720. Examples of the touch panel 721 include a pressure-sensing panel and an electrostatic panel. The touch panel 721 detects a position on the display 720 touched by a finger, a stylus, or the like. The bus line 710 electrically connects these hardware elements. Examples of the bus line 710 include an address bus and a data bus.

Figure 4:
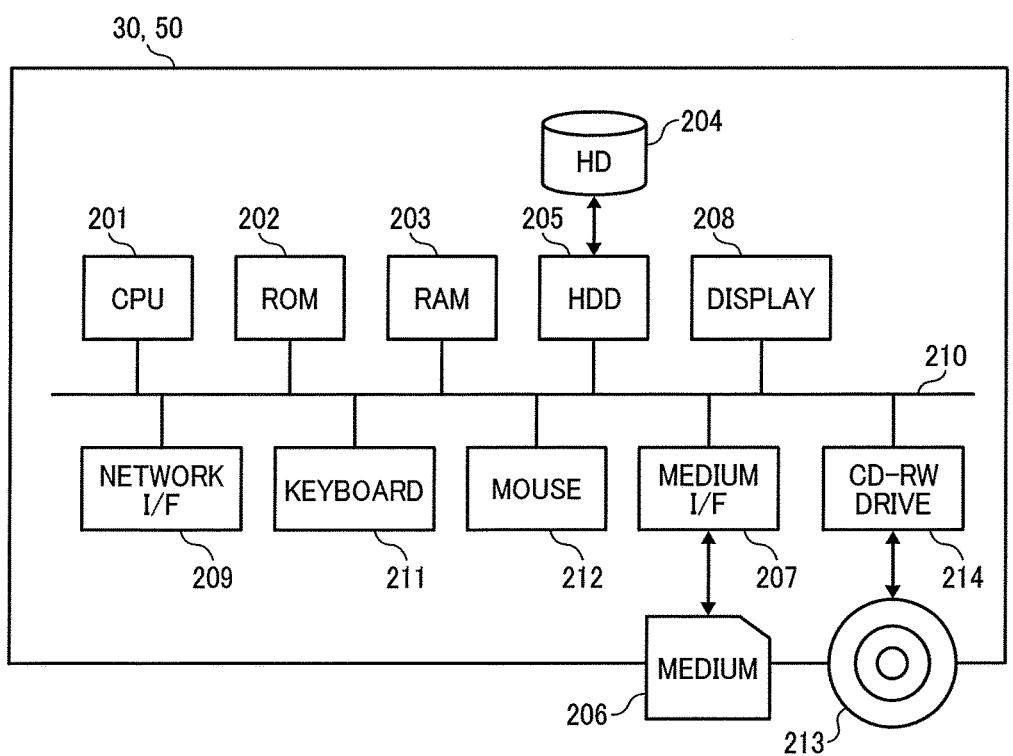
FIG. 4 is a schematic block diagram illustrating a hardware configuration of a communication management system according to an embodiment of the present disclosure.

FIG. 4 is a schematic block diagram illustrating a hardware configuration of the management system 50 according to an embodiment of the present disclosure. The management system 50 includes a CPU 201, a ROM 202, a RAM 203, an HD 204, a hard disc drive (HDD) 205, a medium I/F 207, a display 208, a network OF 209, a keyboard 211, a mouse 212, a compact disc rewritable (CD-RW) drive 214, and a bus line 210. The CPU 201 controls entire operation of the management system 50. The ROM 202 stores a control program for controlling the CPU 201 such as an IPL. The RAM 203 is used as a work area for the CPU 201. The HD 204 stores various data such as programs for the management system 50. The HDD 205 controls reading or writing of various data to or from the HD 204 under control of the CPU 201. The medium I/F 207 controls reading or writing (storing) of data to/from a storage medium 206 such as a flash memory. The display 208 displays various types of information such as a cursor, menus, windows, characters, or images. The network I/F 209 enables communication of data with an external device through the communication network 2. The keyboard 211 includes a plurality of keys to allow a user to input characters, numbers, and various types of instructions. The mouse 212 allows a user to input an instruction for selecting and executing various functions, selecting a target for processing, or moving the cursor. The CD-RW drive 214 controls reading and writing of data from and to a CD-RW 213, which is one example of a removable storage medium. The bus line 210 electrically connects these hardware elements of the management system 50 to each other as illustrated in FIG. 4. Examples of the bus line 210 include an address bus and a data bus.

Since the relay apparatus 30 has a hardware configuration that is the same as or similar to that of the above-described management system 50, descriptions thereof are omitted.

Figure 5A:
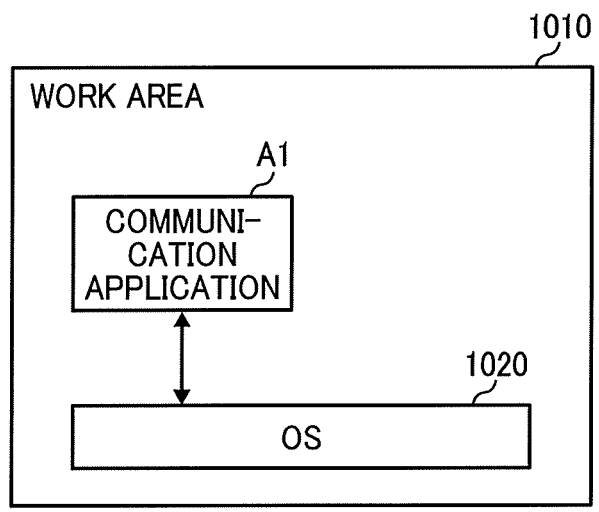
FIGS. 5A and 5B are schematic block diagrams, each illustrating a software configuration of the communication terminal according to an embodiment of the present disclosure.

Hereinafter, an application software is simply referred to as an "application". FIG. 5A is a schematic block diagram illustrating a software configuration of the terminal 10 according to an embodiment of the present disclosure. The terminal 10 is installed with a communication application A1 as a client application. As illustrated in FIG. 5A, an operating system (OS) 1020 and the communication application A1 operate on a work area 1010 of the RANI 103 of the terminal 10. The OS 1020 is basic software that controls entire operation of the terminal 10 through providing basic functions. The communication application A1 is an application that enables the terminal 10 to communicate with other terminals.

Figure 5B:
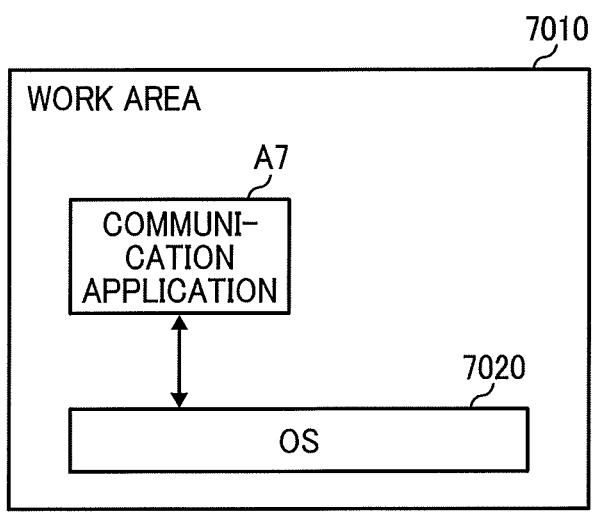

FIG. 5B is a schematic block diagram illustrating a software configuration of the terminal 70 according to an embodiment of the present disclosure. The terminal 70 is installed with a communication application A7 as a client application. As illustrated in FIG. 5B, an operating system (OS) 7020 and the communication application A7 operate on a work area 7010 of the RAM 703. The OS 7020 is basic software that controls entire operation of the terminal 70 through providing basic functions. The communication application A7 is an application that enables the terminal 70 to communicate with other terminals.

Examples of a communication protocol of the communication application A1 and the communication application A7 include, but not limited to, (1) session initial protocol (SIP), (2) H.323, (3) the extended SIP, (4) Instant Messenger (IM) Protocol, (5) protocol using the SIP message method, (6) Internet relay chat (IRC) protocol, and (7) extended IM based protocol. Examples of the above (4) IM Protocol include, but not limited to, (4-1) extensible messaging and presence protocol (XMPP), (4-2) ICQ (Registered Trademark), AIM (Registered Trademark), and Skype (Registered Trademark). In addition, examples of the above (7) extended IM-based protocol include, but not limited to, Jingle.

<<Functional Configuration of Embodiment>>

Figure 6:
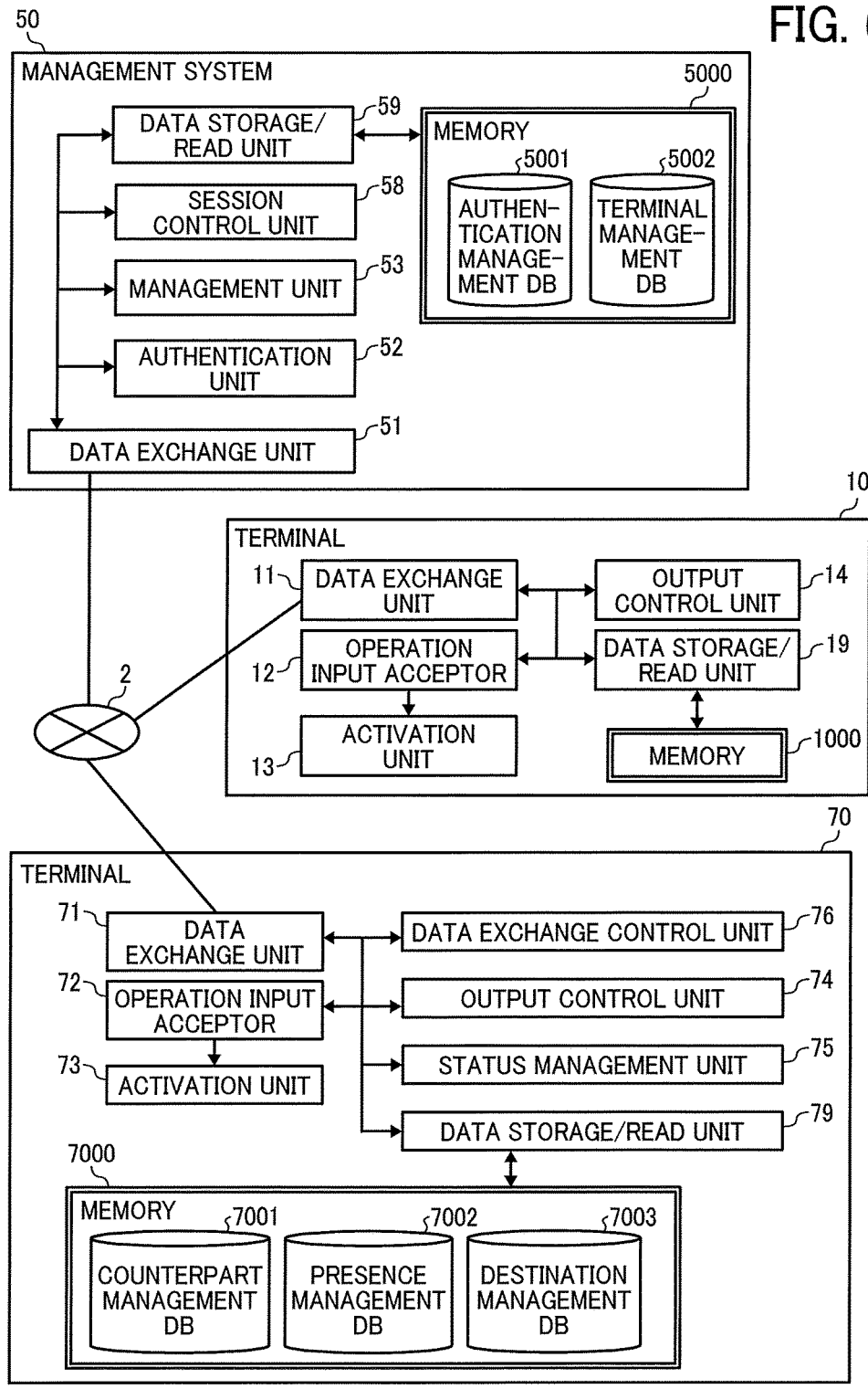
FIG. 6 is a schematic block diagram illustrating a functional configuration of the communication terminal and the communication management system constituting a part of the communication system according to an embodiment of the present disclosure.

Hereinafter, a description is given of a functional configuration according to the present embodiment. FIG. 6 is a schematic block diagram illustrating a functional configuration of the terminal 10, the terminal 70, and the management system 50, as a part of the communication system 1, according to an embodiment of the present disclosure. In FIG. 6, the terminal 10, the terminal 70, and the management system 50 are connected through the communication network 2 transmit or receive data.

<Functional Configuration of Terminal>

The terminal 10 includes a data exchange unit 11, an operation input acceptor 12, an activation unit 13, an output control unit 14, and a data storage/read unit 19. The terminal 70 includes a data exchange unit 71, an operation input acceptor 72, an activation unit 73, an output control unit 74, and a data storage/read unit 79. The terminal 70 further includes a state management unit 75 and a transmission control unit 76. These units are functions that are implemented by or that are caused to function by operating any of the hardware elements illustrated in FIGS. 3A and 3B in cooperation with the instructions of the CPU 101 and the CPU 701 according to the programs expanded from the flash memory 104 or the EEPROM 704 to the RAM 103 and the RAM 703.

The terminal 10 further includes a memory 1000, which is implemented by the ROM 102, the RAM 103, or the flash memory 104 of FIG. 3A. The terminal 70 includes a memory 7000, which is implemented by the ROM 702, the RAM 703, or the EEPROM 704 of FIG. 3B.

(Counterpart Management Table)

FIG. 7A is an illustration of an example data structure of a counterpart management table. The memory 7000 of the terminal 70 stores a counterpart management database (DB) 7001 implemented by the counterpart management table as illustrated in FIG. 7A. The counterpart management table stores, a contact ID of the terminal 10, which is a counterpart candidate (destination candidate), used by an operator, a presence indicating a state of the counterpart candidate, and attribute information indicating an attribute of the counterpart candidate in association with one another. The contact ID is any information for identifying a communication destination in the communication system 1. Examples of the contact ID include, but not limited to, terminal identification information for identifying the terminal 10 and the terminal 70 such as the terminal ID, and identification information for identifying a user of the terminal 10 and the terminal 70 such as a user account. In the following, it is assumed that the terminal identification information is used as the contact ID of the terminal 10 and the terminal 70. A detailed description is given later of the presence.

(Presence Management Table)

FIG. 7B is an illustration of an example data structure of a presence management table. The memory 7000 of the terminal 70 stores a presence management DB 7002 implemented by the presence management table as illustrated in FIG. 7B The presence management table stores the following information items (a) to (d) in association with one other:

(a) Attribute information indicating an attribute of a counterpart candidate;

(b) A presence integrating a plurality of presences of counterpart candidates, whose attribute is an attribute indicated by the associated attribute information;

(c) The contact ID(s) of the terminal(s) 10 whose presence is "Online" indicating that the terminal 10 is available for chatting, among the counterpart candidates having an attribute indicated by the associated attribute information, and (d) The contact ID(s) of the terminal(s) 10 whose presence is "Chat" indicating that the terminal 10 is currently chatting, among the counterpart candidates having an attribute indicated by the associated attribute information.

A detailed description is given later of generating an attribute's presence by integrating the plurality of presences of the counterpart candidates.

(Destination Management Table)

FIG. 7C is an illustration of an example data structure of a destination management table. The memory 7000 of the terminal 70 stores a destination management DB 7003 implemented by the destination management table as illustrated in FIG. 7C. In the present embodiment, terminal 10 is used by a customer, and the terminal 70 is used by an operator. The terminal 70 is able to transmit a chat start request to the plurality of terminals 10 at the same timing. The destination management table stores the contact ID(s) of the terminal(s) 10, which is a destination of a current chat start request from the own terminal 70. The number of contact IDs stored in the destination management table changes according with transmission of the chat start request by the own terminal 70 and cancelling of the chat start request.

A detailed description is given hereinafter of each functional unit of the terminal 10 and the terminal 70. In the following description of the functional configuration of the terminal 10 and the terminal 70, relationships of one or more hardware elements in FIG. 3A and FIG. 3B with each functional unit of the terminal 10 and the terminal 70 in FIG. 6 will also be described.

The data exchange unit 11, which is implemented by the instructions of the CPU 101 and the network I/F 111, transmits or receives various data (or information) to or from the counterpart terminal, device, or system, through the communication network 2. The data exchange unit 71, which is implemented by the instructions of the CPU 701 and the communication device 711, transmits or receives various data (or information) to or from the counterpart terminal, device, or system, through the communication network 2.

The operation input acceptor 12, which is implemented by instructions of the CPU 101, the operation keys (108a, 108b, 108c, 108d, 108e), and the power switch 109, receives various inputs or selections from a user (operator). The operation input acceptor 72, which is implemented by instructions of the CPU 701 and the touch panel 721, receives various inputs or selections from a user (customer).

The activation unit 13, which is implemented by the instructions of the CPU 101, activates operation of the communication application A1. The activation unit 73, which is implemented by the instructions of the CPU 701, activates operation of the communication application A7.

The output control unit 14, which is implemented by the instructions of the CPU 101, the display I/F 117, and the audio input/output IX 116, controls output of image data and audio data. The output control unit 74, which is implemented by the CPU 701, controls output of image data and sound data.

The state management unit 75 of the terminal 70, which is implemented by the instructions of the CPU 701, manages the state of the counterpart candidate based on the presence information transmitted from the terminal 10.

The transmission control unit 76 of the terminal 70, which is implemented by the instructions of the CPU 701, controls transmission of a chat start request to the counterpart candidate based on the state of the counterpart candidate.

The data storage/read unit 19, which is implemented by the instructions of the CPU 101, stores various data in the memory 1000 or reads out various data from the memory 1000. The data storage/read unit 79, which is implemented by the instructions of the CPU 701, stores various data in the memory 7000 or reads out various data from the memory 7000.

<Functional Configuration of Management System>

Referring to FIG. 6, the management system 50 includes a data exchange unit 51, an authentication unit 52, a management unit 53, a session control unit 58, and a data storage/read unit 59. These units are functions that are implemented by or that are caused to function by operating any of the hardware elements illustrated in FIG. 4 in cooperation with the instructions of the CPU 201 according to the programs for the management system 50 expanded from the HD 204 to the RAM 203. The management system 50 further includes a memory 5000, which is implemented by the HD 204. The memory 5000 further stores a plurality of databases (DBs) as described below.

(Authentication Management Table)

FIG. 7D is an illustration of an example data structure of an authentication management table. The memory 5000 stores an authentication management DB 5001, which is implemented by the authentication management table as illustrated in FIG. 7D. In the authentication management table, for each one of the terminals 10 and the terminals 70 managed by the management system 50, the contact ID and the password are stored in association with each other.

(Terminal Management Table)

FIG. 7E is an illustration of an example data structure of a terminal management table. The memory 5000 stores a terminal management DB 5002, which is implemented by the terminal management table as illustrated in FIG. 7E. The terminal management table stores, for each one of the terminals 10 and the terminals 70, the contact ID of the terminal 10 and the terminal 70 and the IP address of the terminal 10 and the terminal 70, in association with each another.

<Each Functional Unit of Management System>

A detailed description is given hereinafter of each functional unit of the management system 50. In the following description of functional configuration of the management system 50, relationships of one or more hardware elements in FIG. 4 with functional unit of the management system 50 in FIG. 6 is also described.

The data exchange unit 51, which is implemented by the instructions of the CPU 201 and the network I/F 209, transmits or receives various data (or information) to or from each terminal, device, or system through the communication network 2.

The authentication unit 52, which is implemented by the instructions of the CPU 201, searches the authentication management table (FIG. 7D) using a contact ID and a password received at the data exchange unit 51 as a search key, to authenticate the terminal 10 and the terminal 70 based on determination of whether the same contact ID and password are stored in the authentication management table.

The management unit 53, which is implemented by the instructions of the CPU 201, records information of the terminals 10 in the terminal management table (FIG. 7E) to manage the terminals 10.

The session control unit 58, which is implemented by the instructions of the CPU 201, controls a session to be used for exchanging content data between the terminal 10 and the terminal 70. Examples of the control performed by the session control unit includes control for establishing a session, control for enabling the terminal 10 and the terminal 70 to participate in the established session, and control for enabling the terminal 10 and the terminal 70 to leave the session.

The data storage/read unit 59, which is implemented by the instructions of the CPU 201 and the HDD 205, or the instructions of the CPU 201, stores various data in the memory 5000 or reads various data from the memory 5000.

<<Process/Operation of Communication System 1>>

Hereinafter, a description is given of an operation and processes performed by the communication system 1.

Figure 8:
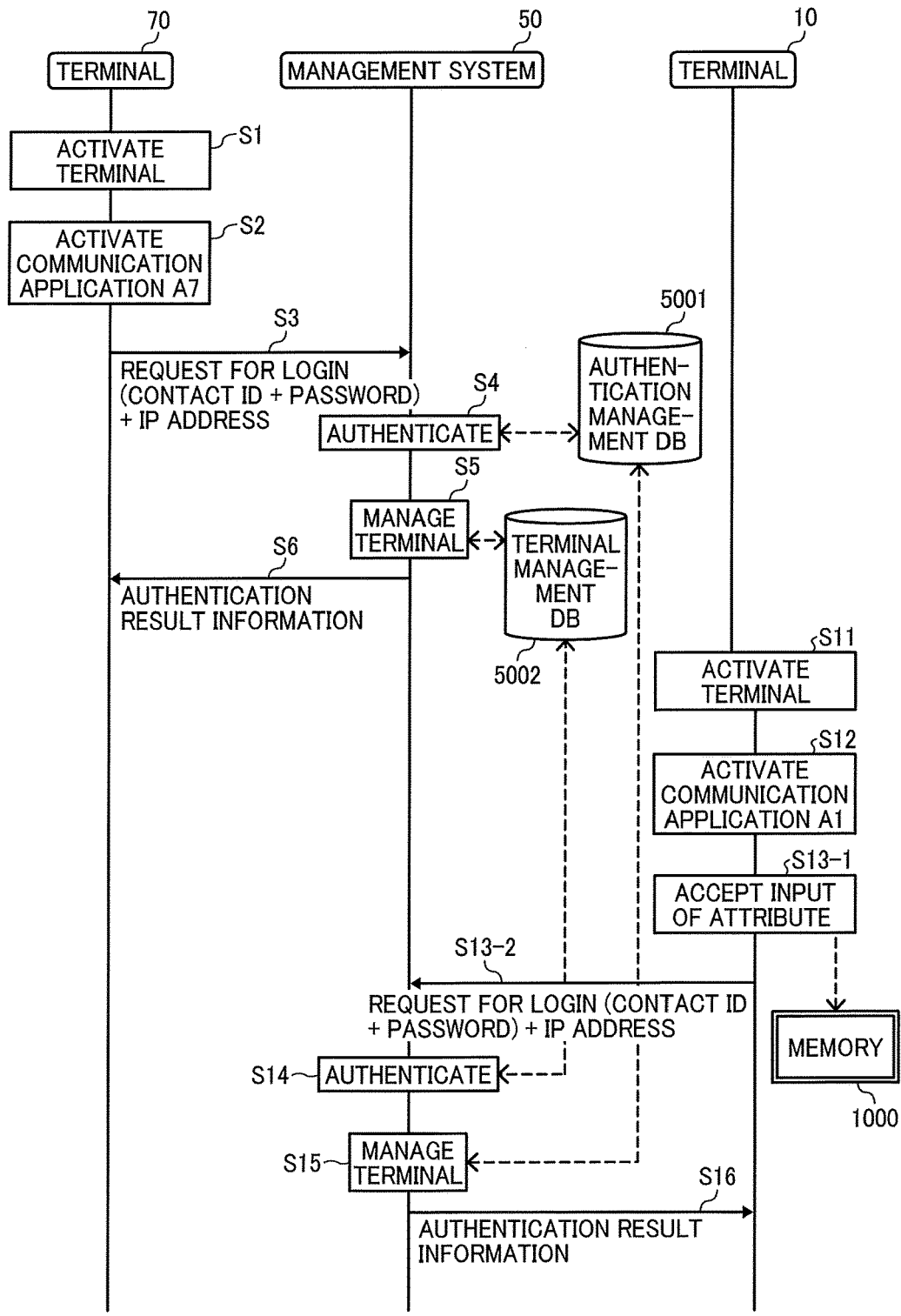
FIG. 8 is a sequence diagram illustrating an example operation in which the communication terminal logs in the communication management system, according to an embodiment of the present disclosure.

First, a description is given of an operation in which the terminal 10 and the terminal 70 log in the management system 50, with reference to FIG. 8. FIG. 8 is a sequence diagram illustrating an example operation in which the terminal 10 and the terminal 70 logs in the management system 50.

When a user (customer) turns on a power switch of the terminal 70, the operation input acceptor 72 accepts the power-on operation and starts up the terminal 70 (S1). When the terminal 70 starts up, the activation unit 73 starts up the communication application A7 installed in the terminal 70 (S2). The processes after S2 by the terminal 70 are executed by instructions of the communication application A7.

The data exchange unit 71 of the terminal 70 transmits a login request to the management system 50 via the communication network 2 (S3). This login request includes a contact ID for identifying the own terminal 70 that sends the login request, and a password. In the present embodiment, an initial letter of the contact ID of the terminal 70 is "C", which represents that the terminal 70 is a terminal on the customer side. In the following, it is assumed that the terminal 70x and terminal 70y are respectively assigned with the contact IDs "C01" and "C02".

The management system 50 receives the login request at the data exchange unit 51. As the terminal 70 sends the login request to the management system 50 as the receiver side, the management system 50 obtains the IP address of the terminal 70 as the sender side, the IP address being transmitted with the login request.

The authentication unit 52 of the management system 50 searches the authentication management table (FIG. 7D) of the memory 5000 using the contact ID and password included in the login request as a search key to authenticate the terminal 70 based on determination of whether the same contact ID and password are stored in the authentication management table (S4).

When the authentication unit 52 determines that the login request is a login request received from a terminal 70 that has a legitimate use authority, the management unit 53 stores, in the terminal management table (FIG. 7E), the contact ID and IP address of the terminal 70 from which the login requests is received in association with one another (S5).

The data exchange unit 51 of the management system 50 transmits authentication result information indicating an authentication result, obtained by the authentication unit 52, to the terminal 70 that sends the login request, through the communication network 2 (S6). The terminal 70 receives the authentication result at the data exchange unit 71. In the following, a description is given of an example case in which the management system 50 has successfully authenticated the terminal 70x and the terminal 70y from which the login request has been received, and the terminal 70x and the terminal 70y has logged in the management system 50.

On the other hand, when a user (operator) of the terminal 10 turns on the power switch 109, the operation input acceptor 12 accepts the power-on operation and starts up the terminal 10 (S11). When the terminal 10 starts up, the activation unit 13 starts up the communication application A1 installed in the terminal 10 (S12). The processes after S12 by the terminal 10 are executed by instructions of the communication application A1.

The output control unit 14 of the terminal 10 displays, on the display 120, an acceptance screen 140 that enables an operator, who is a user of the terminal 10, to input the operator's attribute. FIG. 9 illustrates an example of the acceptance screen 140. The acceptance screen 140 includes, in addition to fields for accepting the input of the contact ID and the password, a plurality of support languages, as the attribute of the operator, to be selected by checking a mark in a check box. When the operator selects one or more language that he/she is able to support and presses an OK button on the acceptance screen 140, the operation input acceptor 12 accepts the input of the attributes of the operator (step S13-1). The data storage/read unit 19 stores the attribute information corresponding to the selected attribute in the memory 1000. In the following, it is assumed that the attribute information corresponding to the attributes "English", "Chinese", "Korean", "Portuguese", "Spanish", "Thai", and "Russian" are "en", "zh", "ko", "pt", "es", "th", and "ru", respectively.

The terminal 10 transmits a login request to the management system 50 to log in the management system 50 (S13-2, S14, S15, and S16). Processes of S13-2, S14, S15 and S16 are performed in substantially the similar manner as described above referring to S3, S4, S5 and S6 between the terminal 70 and the management system 50, and the description thereof is omitted. An initial letter of the contact ID transmitted from the terminal 10 to the management system 50 in the login request is "O", which represents that a terminal is the terminal 10 on the operator side. In the following, it is assumed that the terminal 10a, 10b and 10c are respectively assigned with the contact IDs "O01", "O02" and "O03". When the management system 50 successfully authenticates the terminal 10a, the terminal 10b, and the terminal 10c, from which the login request is received, the terminal 10a, the terminal 10b, and the terminal 10c log in the management system 50.

Figure 10:
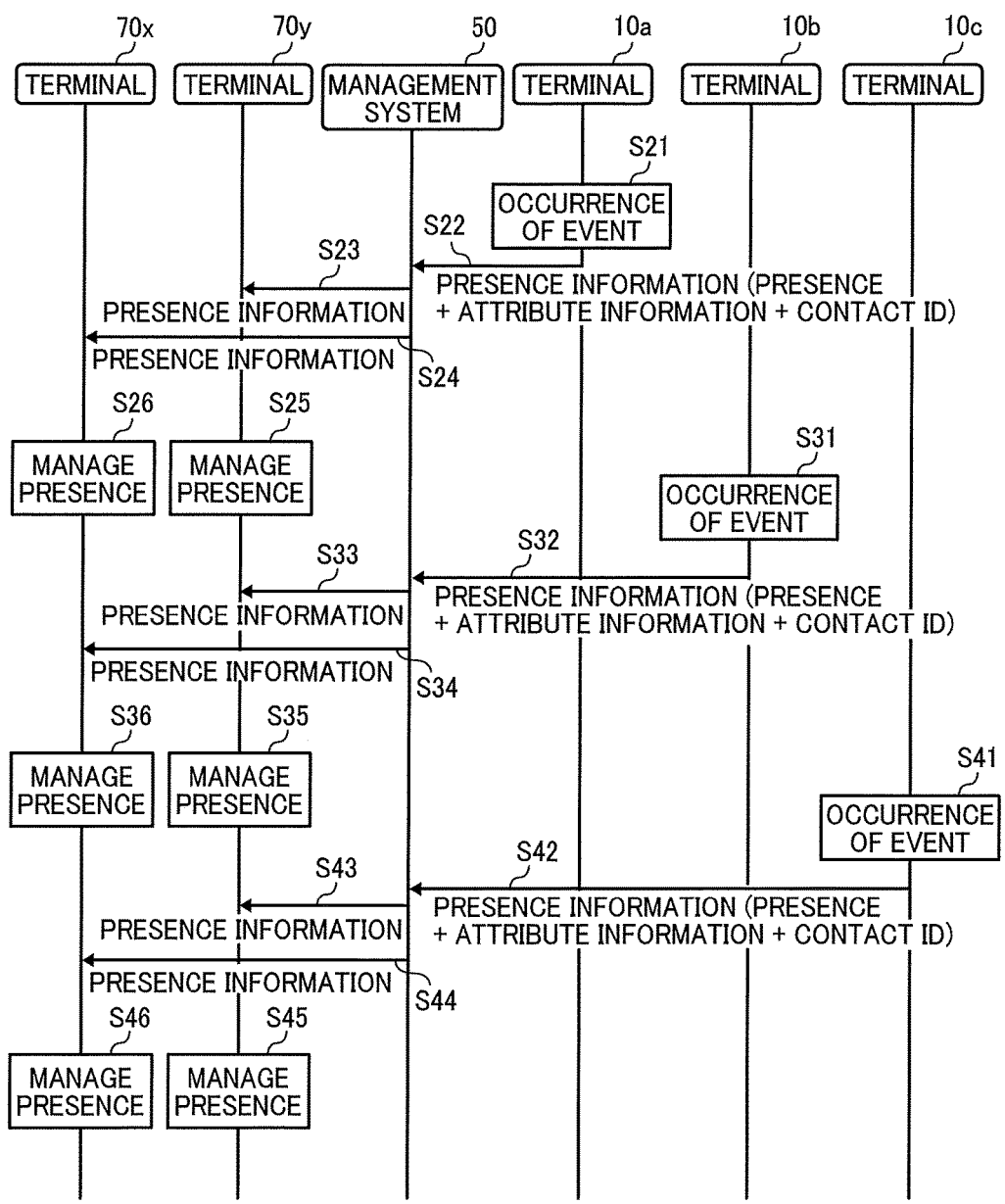
FIG. 10 is a sequence diagram illustrating an example operation of transmitting presence information, according to an embodiment of the present disclosure.

Next, a description is given of an operation of transmitting presence information indicating the state on the operator side from the terminal 10 to the terminal 70, with reference to FIG. 10. FIG. 10 is a sequence diagram illustrating an example operation of transmitting the presence information.

The communication application A1 manages, in the memory 1000, events that trigger a state transition and a presence after the transition caused by occurrence of any one of the events. The presence is used to determine whether an operator, who is a user of the terminal 10, is in a state of being able to start a chat. The presence indicating the state of being able to start a chat includes "Online", which indicates a state in which the terminal 10 has logged in the management system 50 and is not communicating with the terminal 70 on the customer side. The presence indicating a state of not being able to start a chat includes "Offline" indicating a state in which the terminal 10 has not logged in the management system 50. The presence indicating the state of not being able to start a chat further includes "Chat" indicating a state in which although the terminal 10 has logged in the management system 50, the terminal 10 is not able to start a new chat because the terminal 10 is already communicating with the terminal 70 on the customer side. These presences are just examples, and any suitable presence may be provided. For example, the presence may be based on a user input. Examples of the presence based on the user input include "Away", which is an example of the presence indicating a state of not being able to start a chat.

Examples of an event that triggers the transition to the presence "Online" include receiving the authentication result information at the terminal 10 (S16), or accepting input of a chat end request from the user. Examples of an event that triggers the transition to the presence "Offline" include logging out from the management system 50 by the terminal 10. Examples of an event that triggers the transition to the presence "Chat" include establishment of communication between the terminal 70 and the terminal 10 (S105, described later). These are just examples of the event that triggers the transition of presence. Any suitable event may trigger the transition, as long as it is detectable. The event can be arbitrarily set according to a communication protocol or processing contents by the communication application A1.

When any of the above events occurs at the terminal 10a (S21), the data storage/read unit 19 reads out the attribute information from the memory 1000. More specifically, the data storage/read unit 19 reads out the attribute information corresponding to the attributes such as "English, Chinese, Spanish" input by an operator, who is a user of the terminal 10a, at the time of login in at S13-1 of FIG. 8. The data exchange unit 11 of the terminal 10a transmits presence information to the management system 50 (S22) The presence information transmitted at S22 includes a presence indicating the state of the terminal 10a after the transition triggered by the event occurrence at S21, the attribute information that is read out from the memory 1000, and the contact ID "O01" of the terminal 10a, which is a sender terminal. For example, in response to receiving the authentication result information at S16 of FIG. 8, the terminal 10a transmits the presence information including the presence "Online" to the management system 50. In response to receiving a logout request, the terminal 10a transmits the presence information including the presence "Offline" to the management system 50. When communication is established between the terminal 10a and the terminal 70, the terminal 10a transmits the presence information including the presence "Chat" to the management system 50. In a case in which no update of the attribute information is performed after the attribute information is recorded in the memory 1000 at S13-1 of FIG. 8, the terminal 10a transmits presence information including the same attribute information to the management system 50 every time an event occurs.

In response to receiving the presence information from the terminal 10a, the data exchange unit 51 of the management system 50 transmits the received presence information to the terminal 70x and the terminal 70y on the customer side that has logged in the management system 50 (S23, S24). The management system 50 specifies the terminal(s) 70 that has logged in the management system 50 by, for example, reading out the contact ID(s) whose initial letter is C from the terminal management table (FIG. 7E). This is just an example, and the terminal 70 that has logged in the management system 50 may be identified in any suitable manner.

The data exchange unit 71 of the terminal 70x and the terminal 70y receives the presence information from the terminal 10a on the operator side via the management system 50. The data storage/read unit 79 of the terminal 70x and the terminal 70y stores the contact ID, the presence, and the attribute information, which are included in the received presence information, in the counterpart management table (FIG. 7A) in association with one another (S25, S26). In a case in which the counterpart management table already contains a record of the same contact ID as the contact ID included in the received presence information, the data storage/read unit 79 overwrites the presence existing in the record with a new presence indicated by the received presence information. Thus, the terminal 70x and the terminal 70y manage the latest presence of the terminal 10a.

When any one of the events as described above occurs at the terminal 10b on the operator side, processes of S31, S32, S33, S34, S35 and S36 are performed between the terminal 10b, the management system 50, terminal 70x, and the terminal 70y in substantially the similar manner to the processes of S21, S22, S23, S24, S25 and S26 performed between the terminal 10a, the management system 50, the terminal 70x and the terminal 70y. When any one of the events as described above occurs at the terminal 10c on the operator side, processes of S41, S42, S43, S44, S45 and S46 are performed between the terminal 10c, the management system 50, terminal 70x, and the terminal 70y in substantially the similar manner to the processes of S21, S22, S23, S24, S25 and S26 performed between the terminal 10a, the management system 50, the terminal 70x and the terminal 70y. Thus, the terminal 70x and the terminal 70y manage the latest presence of the terminal 10b and the terminal 10c.

Figure 11A:
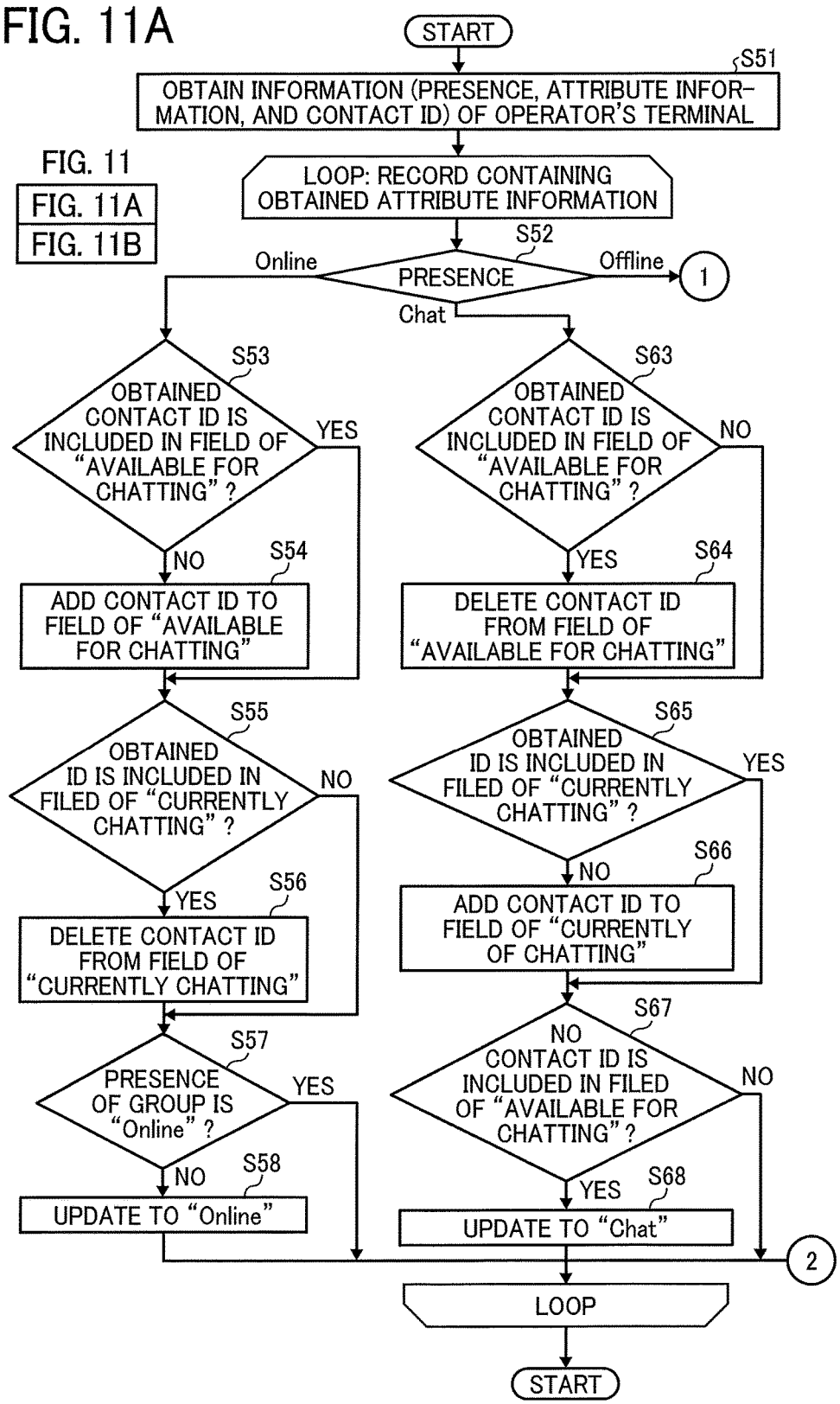
FIGS. 11A and 11B are a flowchart illustrating an example operation of managing a presence for each attribute, according to an embodiment of the present disclosure.
Figure 11B:
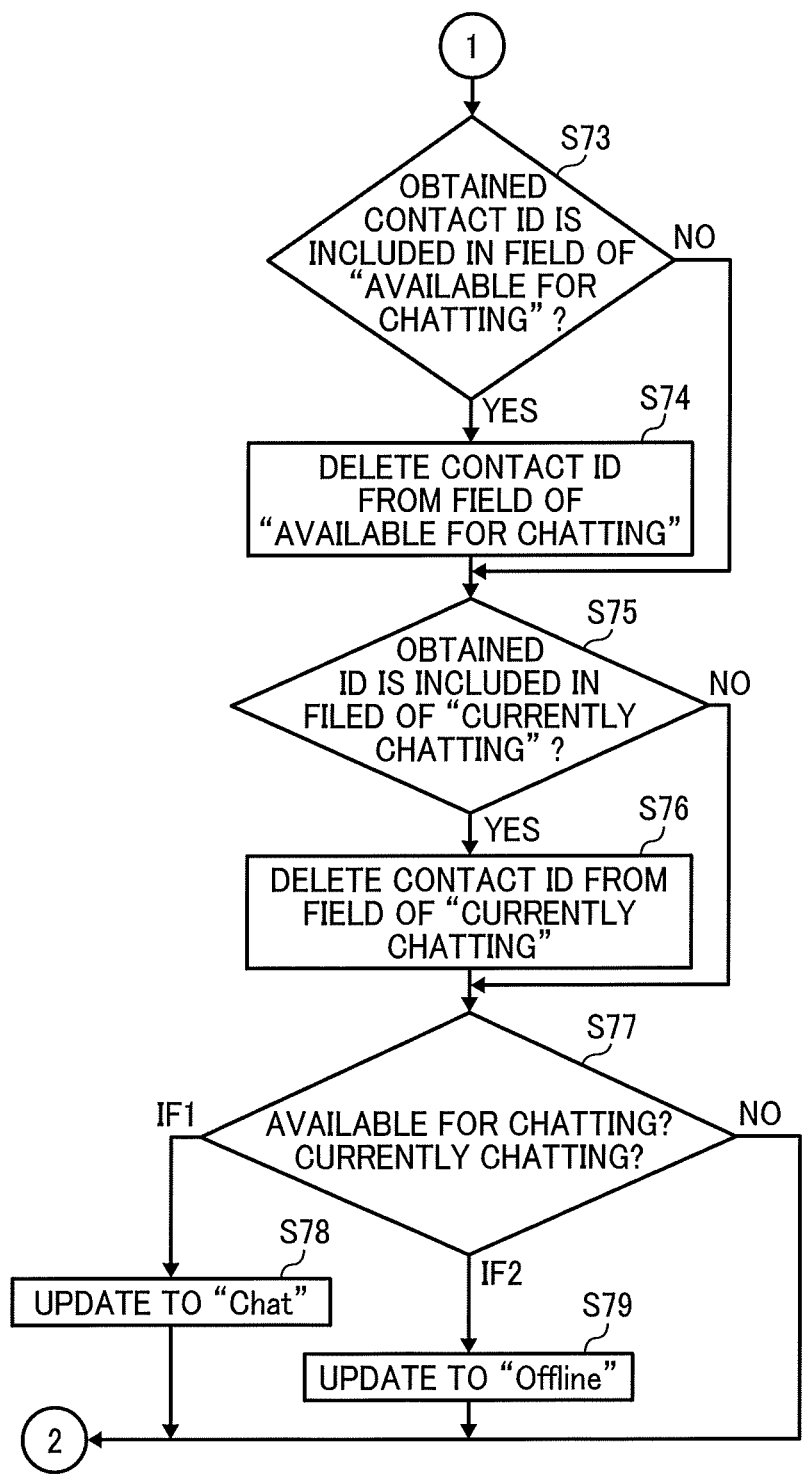

Next, a description is given of an operation of managing a presence for each attribute, with reference to FIGS. 11A and 11B. FIGS. 11A and 11B are a flowchart illustrating an example operation of managing a presence for each attribute. Hereinafter, assuming that a chat is requested from the customer side to the operator side, a terminal on the operator side is referred to as a counterpart candidate. In an example case in which a counterpart candidate selects a plurality of attributes (for example, "English, Chinese, and Spanish") at S13-1 of FIG. 8, this counterpart candidate belongs to a plurality of groups of attribute. When the presence of a certain attribute is "Online", it means that the presence of at least one of the counterpart candidates belonging to a group of the certain attribute is "Online" indicating a state of being able to start a chat. When the presence of a certain attribute is "Chat", it means that none of the counterpart candidates belonging to a group of the certain attribute is in a state of "Online", and that one or more counterpart candidate(s) whose presence is "Chat" indicating a state of being chatting is belonging to the group of the certain attribute. When the presence of a certain attribute is "Offline", it means that any of the counterpart candidates belonging to a group of the certain attribute is in a state of presence "Offline". Although in the following, a description is given hereinafter of an operation performed by the terminal 70x, the terminal 70y is capable of performing substantially the similar operation.

Each time the presence in the counterpart management table (FIG. 7A) is updated at S26, S36, and S46, the state management unit 75 of the terminal 70x acquires the contact ID, the presence, and the attribute information included in the updated record (S51).

The state management unit 75 of the terminal 70x updates each record including the attribute information acquired at S51 of the presence management table (FIG. 7B). In other words, in an example case in which the attribute information "en, zh, es" is acquired at S51, the state management unit 75 updates each record including the attribute information "en", "zh" or "es" in the presence management table.

Hereinafter, a description is given of, as an example, an operation performed when the terminal 10a transmits, via the management system 50, the presence information "Online, (en, zh, es), O01" to the terminal 70x, and the state management unit 75 acquires "O01" "Online", and "en, zh, es" at S51 (S52: Online).

First, a description is given of an operation of updating a record including "en" as the attribute information in the presence management table by loop processing. The state management unit 75 of the terminal 70x refers to a field listing the contact ID(s) of the terminal(s) 10 in a state of being able to start a chat in the record containing "en" as the attribute information, in the presence management table (FIG. 7B). Hereinafter, the field listing the contact ID(s) of the terminal(s) 10 in a state of being able to start a chat is referred to as a "chat available field", to simplify the description. With this process, the state management unit 75 determines whether the contact ID "O01" acquired at S51 is included in the chat available field (S53).

When the state management unit 75 determines that the contact ID "O01" acquired at S51 is not included in the chat available field in the presence management table (S53: NO), the state management unit 75 adds, in chat available field, the acquired contact ID "O01" (S54).

After S54 or in a case in which a determination result at S53 is YES, the state management unit 75 of the terminal 70x refers to a field listing the contact ID(s) of the terminal(s) 10 in a state of currently chatting in the record containing "en" as the attribute information, in the presence management table (FIG. 7B). Hereinafter, the field listing the contact ID(s) of the terminal(s) 10 in a state of currently chatting is referred to as a "currently chatting field, to simplify the description. With this process, the state management unit 75 determines whether the contact ID "O01" acquired at S51 is included in the currently chatting field (S55).

When the state management unit 75 determines that the contact ID "O01" acquired at S51 is included in the currently chatting field in the presence management table (S55: YES), the state management unit 75 deletes the acquired contact ID "O01" from the currently chatting field (S56). With the processes so far, in a case in which the presence of the terminal 10a transitions from "Chat" to "Online" or from "Offline" to "Online", the contact ID of the terminal 10a is recorded only in the chat available field, in the record including "en" as the attribute information in the presence management table.

After S56 or in a case in which a determination result at S55 is NO, the state management unit 75 of the terminal 70x refers to a field of group presence in the record containing "en" as the attribute information, in the presence management table (FIG. 7B). With this process, the state management unit 75 determines whether the presence of the group is "Online" (S57).

When the state management unit 75 determines that the presence of attribute in the record containing "en" as the attribute information is not "Online" (S57: NO), the state management unit 75 updates the presence of this attribute to "Online". When the state management unit 75 determines that the presence of attribute in the record containing "en" as the attribute information is "Online" (S57: YES), the state management unit 75 does not update the presence of attribute in the record containing "en" as the attribute information. With the processes so far, the presence of attribute in the record containing "en" as the attribute information in the presence management table is updated to or remains "Online".

Since the attribute information "en, zh, es" is acquired at S51, the state management unit 75 performs a loop processing from S52 to S58 for each of records containing "zh" and "es" as the attribute information in the presence management table to update these records. When the loop processing ends, the presence management table of FIG. 7A is updated as Table 1.

TABLE 1

| Attribute information | Group presence | Contact ID of terminal that can start a chat | Contact ID of terminal that is currently chatting |
|---|---|---|---|
| en | Online | O01, O02, O03 | |
| zh | Online | O01 | |
| ko | Online | O03 | |
| pt | Online | O02, O03 | |
| es | Online | O01, O02 | |
| th | Online | O02 | |
| ru | Online | O02 | |

Next, a description is given hereinafter of an operation performed when the terminal 10a transmits, via the management system 50, the presence information "Chat, (en, zh, es), O01" to the terminal 70x, and the state management unit 75 acquires "O01" "Chat", and "en, zh, es" at S51 (S52: Chat).

First, a description is given of an operation of updating a record containing "en" as the attribute information in the presence management table by loop processing. The state management unit 75 of the terminal 70x refers to the chat available field in the record containing "en" as the attribute information, in the presence management table (Table 1). With this process, the state management unit 75 deter mines whether the contact ID "O01" acquired at S51 is included in the chat available field (S63).

When the state management unit 75 determines that the contact ID "O01" acquired at S51 is included in the chat available field in the presence management table (S63: YES), the state management unit 75 deletes the acquired contact ID "O01" from the chat available field (S64).

After S64 or in a case in which a determination result at S63 is NO, the state management unit 75 of the terminal 70x refers to the currently chatting field in the record containing "en" as the attribute information, in the presence management table (Table 1). With this process, the state management unit 75 determines whether the contact ID "O01" acquired at S51 is included in the currently chatting field (S65).

When the state management unit 75 determines that the contact ID "O01" acquired at S51 is not included in the currently chatting field in the presence management table (S65: NO), the state management unit 75 adds, in the currently chatting field, the acquired contact ID "O01" (S66). With the processes so far, the contact ID of the terminal 10a is recorded only in the currently chatting field, in the record containing "en" as the attribute information in the presence management table.

After S66 or in a case in which a determination result at S65 is YES, the state management unit 75 of the terminal 70x refers to the chat available field in the record containing "en" as the attribute information, in the presence management table (Table 1). With this process, the state management unit 75 determines whether the number of the contact IDs listed in the chat available field in the record containing "en" as the attribute information is zero (S67).

When the state management unit 75 determines that the number of contact IDs listed in the chat available field in the record containing "en" as the attribute information is zero (S67: YES), the state management unit 75 updates the presence of attribute in the record containing "en" as the attribute information to "Chat" (S68). When the state management unit 75 determines that the number of contact IDs listed in the chat available field in the record containing "en" as the attribute information "en" is not zero (S67: NO), the state management unit 75 does not update the presence of attribute in the record containing "en" as the attribute information. In other words, in a case in which one or more contact IDs are listed in the chat available field in the record containing "en" as the attribute information, the associated group presence remains "Online".

Since the attribute information "en, zh, es" is acquired at S51, the state management unit 75 performs a loop processing from S52 to S68 for each of records containing "zh" and "es" as the attribute information in the presence management table to update these records. When the loop processing ends, the presence management table of Table 1 is updated as Table 2.

TABLE 2

| Attribute information | Group presence | Contact ID of terminal that can start a chat | Contact ID of terminal that is currently chatting |
|---|---|---|---|
| en | Online | O02, O03 | O01 |
| zh | Chat |  | O01 |
| ko | Online | O03 |  |
| pt | Online | O02, O03 |  |
| es | Online | O02 | O01 |
| th | Online | O02 |  |
| ru | Online | O02 |  |

Next, a description is given of an example case in which the terminal 10c transmits, via the management system 50, the presence information "Offline, (en, ko, pt), O03" to the terminal 70x, and the state management unit 75 acquires these items of the presence information at S51 (S52: Offline).

First, a description is given of an operation of updating a record containing "en" as the attribute information in the presence management table by loop processing. The state management unit 75 of the terminal 70x refers to the chat available field in the record containing "en" as the attribute information, in the presence management table (Table 2). With this process, the state management unit 75 determines whether the contact ID "O03" acquired at S51 is included in the chat available field (S73).

When the state management unit 75 determines that the contact ID "O03" acquired at S51 is included in the chat available field in the presence management table (S73: YES), the state management unit 75 deletes the acquired contact ID "O03" from the chat available field (S74).

After S74 or in a case in which in a determination result at S73 is NO, the state management unit 75 of the terminal 70x refers to the currently chatting field in the record containing "en" as the attribute information, in the presence management table (Table 2). With this process, the state management unit 75 determines whether the contact ID "O03" acquired at S51 is included in the currently chatting field (S75).

When the state management unit 75 determines that the contact ID "O03" acquired at S51 is included in the currently chatting field in the presence management table (S75: YES), the state management unit 75 deletes the acquired contact ID "O03" from the currently chatting field (S76). With the processes so far, the contact ID of the terminal 10c is deleted from the record containing "en" as the attribute information in the presence management table.

After S76 or in a case in which a determination result at S75 is NO, the state management unit 75 of the terminal 70x refers to the chat available field and the currently chatting field in the record containing "en" as the attribute information, in the presence management table (Table 2). With this process, the state management unit 75 determines whether the condition IF1 or the condition IF2 is satisfied (S77). The condition IF1 is satisfied when the number of contact IDs listed in the chat available field in the record containing "en" as the attribute information is zero and the number of contact IDs listed in the currently chatting field is not zero. The condition IF2 is satisfied when the number of contact IDs listed in the chat available field in the record containing "en" as the attribute information is zero and the number of contact IDs listed in the currently chatting field is zero.

When the state management unit 75 determines that the number of contact IDs listed in the chat available field in the record containing "en" as the attribute information is zero and the number of contact TDs listed in the currently chatting field is not zero (S77: IF1), the state management unit 75 updates the presence of attribute in the record containing "en" as the attribute information to "Chat" in the presence management table (S78). When the state management unit 75 determines that the number of contact IDs listed in the chat available field in the record containing "en" as the attribute information is zero and the number of contact Ills listed in the currently chatting field is zero (S77: IF2), the state management unit 75 updates the presence of attribute in the record containing "en" as the attribute information to "Offline" in the presence management table (S79). When neither IF1 nor IF2 is satisfied (S77: NO), the state management unit 75 does not update the presence of attribute in the record containing "en" as the attribute information, so that the presence of attribute remain "Online".

Since the attribute information "en, ko, pt" is acquired at S51, the state management unit 75 performs a loop processing from S52 to S79 for each of records containing "ko" and "pt" as the attribute information in the presence management table to update these records. When the loop processing ends, the presence management table of Table 2 is updated as Table 3.

TABLE 3

| Attribute information | Group presence | Contact ID of terminal that can start a chat | Contact ID of terminal that is currently chatting |
|---|---|---|---|
| en | Online | O02 | O01 |
| zh | Chat |  | O01 |
| ko | Offline |  |  |
| pt | Online | O02 |  |
| es | Online | O02 | O01 |
| th | Online | O02 |  |
| ru | Online | O02 |  |

Hereinafter, a description is given of an operation of starting communication, with reference to FIG. 12. FIG. 12 is a sequence diagram illustrating an example operation of starting communication. Although in the following, a description is given hereinafter of an operation of starting communication performed by the terminal 70x, the terminal 70y is capable of starting communication in substantially the similar manner. In the following description, it is assumed that the counterpart management table is in a state of FIG. 7A and the presence management table is in a state of Table 2 at the time of starting the operation of FIG. 12.

Figure 13:
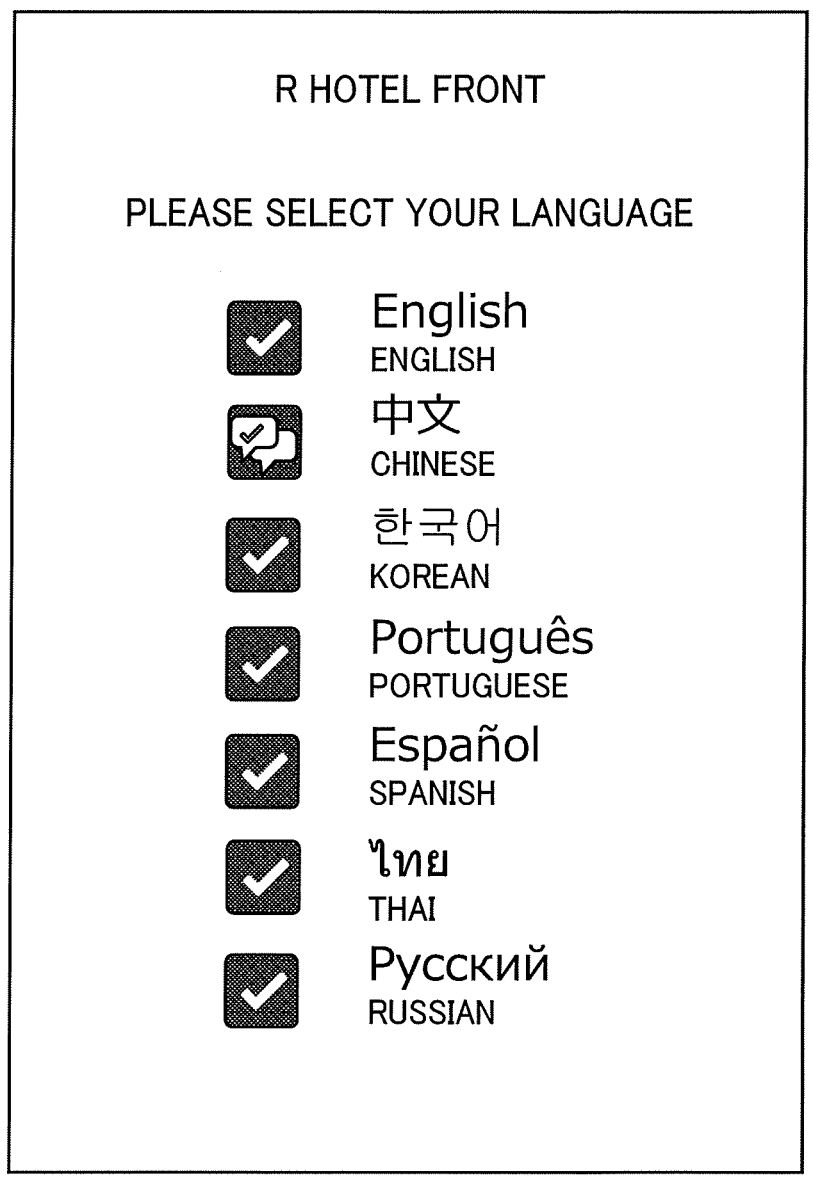
FIG. 13 is a diagram illustrating an example of an attribute list, according to an embodiment of the present disclosure.

The operation input acceptor 12 of the terminal 70 accepts a request for displaying an attribute list of the counterpart candidates, in accordance with an operation input by a user. In response to the display request, the output control unit 74 acquires, for each attribute information stored in the presence management table (Table 2), a combination of the attribute information and the group presence associated with the attribute information. The memory 7000 stores, in advance, data of display images corresponding to the attribute information and display images corresponding to the attribute's presences. For example, the data of a display image corresponding to the attribute information "en" is text data indicating "English ENGLISH". Further, for example, the data of display images corresponding to the attribute's presences "Online", "Offline", and "Chat" is image data of icons representing a check mark, a blank square, and a balloon, respectively. The output control unit 74 acquires, from the memory 7000, a combination of the text data and the data of display image of an icon corresponding to each of the acquired combinations of the attribute information and the presence. The output control unit 74 generates image data of the attribute list by arranging the acquired combinations of the text data and the image data of icon side by side in the same row in a predetermined display area. The output control unit 74 outputs the generated image data of the attribute list to the display 720 (S81). FIG. 13 is a diagram illustrating an example of the attribute list displayed when the presence management table is in the state of Table 2.

The output control unit 74 repeats the above process, each time the presence management table is updated. Thus, the attribute list indicating the latest presence for each attribute is displayed on the display 720.

At S81, the output control unit 74 outputs, among the icons acquired from the memory 7000, the check mark icon corresponding to "Online" as a selectable icon. Further, at S81, the output control unit 74 outputs, among the icons acquired from the memory 7000, the blank square icon corresponding to "Offline" and the balloon icon corresponding "Chat" as unselectable icons. For example, even when a user presses the balloon icon corresponding to "Chinese" in the attribute list illustrated in FIG. 13, the operation input acceptor 72 does not accept the operation input. When a user presses the blank square icon or the balloon icon, the output control unit 74 may output, to the display 720, a message indicating that a chat cannot be started, or a message prompting a user to wait until a chat is started.

When a user presses the check mark icon corresponding to any one of attributes on the screen illustrated in FIG. 13, the operation input acceptor 72 accepts selection of the attribute corresponding to the icon (S82). Hereinafter, a description is given of an operation performed in a case in which selection of the attribute "English" is accepted.

In response to accepting the selection of the attribute "English", the data storage/read unit 79 searches the counterpart management table (FIG. 7A) using the attribute information "en" indicating the attribute selected at S82 as a search key, to read out the corresponding combinations of the contact ID and the presence "O01, Chat", "O02, Online", and "O03, Online" (S83).

The data exchange unit 71 of the terminal 70x transmits a chat start request to the management system 50 (S84-1) This chat start request includes the contact ID "O02" that is associated with the presence "Online" from among the contact IDs read out at S83, the contact ID "C01" of the own terminal 70x, and the attribute information "en" indicating the attribute selected at S82. Further, the data exchange unit 71 of the terminal 70x transmits another chat start request to the management system 50 (S86-1). This chat start request includes the contact ID "O03" that is associated with the presence "Online" from among the contact Ills read out at S83, the contact ID "C01" of the own terminal 70x, and the attribute information "en" indicating the attribute selected at S82.

In response to receiving the chat start request transmitted from the terminal 70x at S84-1, the data exchange unit 51 of the management system 50 transmits this chat start request to the terminal 10b identified by the contact ID "O02" included in the chat start request (S84-2). Further, in response to receiving the chat start request transmitted from the terminal 70x at S86-1, the data exchange unit 51 of the management system 50 transmits this chat start request to the terminal 10c identified by the contact ID "O03" included in the chat start request (S86-2).

The transmission control unit 76 of the terminal 70x updates the destination management table by storing the contact ID "O02" of the terminal 10b, which is a destination of the chat start request, in the destination management table (S85) Further, the transmission control unit 76 of the terminal 70x updates the destination management table by storing the contact ID "O03" of the terminal 10c, which is a destination of the chat start request, in the destination management table (S87).

When input of a chat end request is accepted at the terminal 10a on the operator side (S21'), the data exchange unit 11 transmits the presence information that is read out from the memory 1000, to the management system 50 (S22'). This presence information includes the attribute information "en, zh, es", the contact ID "O01" of the terminal 10a, and the presence "Online".

In response to receiving the presence information from the terminal 10a, the data exchange unit 51 of the management system 50 transmits the received presence information to the terminal 70x on the customer side that has been logged in the management system 50 (S24').

The data exchange unit 71 of the terminal 70x receives the presence information from the terminal 10a on the operator side via the management system 50. The data storage/read unit 79 of the terminal 70x stores the contact Ill, the presence, and the attribute information, which are included in the received presence information, in the counterpart management table (S26'). Accordingly, the counterpart management table is updated from the state of FIG. 7A to the state of Table 4.

TABLE 4

| Contact ID | Presence | Attribute information |
|---|---|---|
| O01 | Online | en, zh, es |
| O02 | Online | en, es, pt, ru, th |
| O03 | Online | en, ko, pt |

The transmission control unit 76 of the terminal 70x determines whether to transmit a chat start request to the terminal 10a as a sender terminal of the presence information received at S24' (S88). More specifically, the transmission control unit 76 of the terminal 70x refers to the presence of the terminal 10a updated in the counterpart management table, to determine whether the presence is "Online" When the transmission control unit 76 determines that the presence of the terminal 10a is a state other than "Online", the transmission control unit 76 determines that a chat start request is not to be transmitted. Then, the operation ends.

By contrast, when the transmission control unit 76 determines that the presence of the terminal 10a is "Online", the transmission control unit 76 refers to the attribute information "en, zh, es" of the terminal 10a stored in the counterpart management table, to determine whether any one of the attribute information indicates an attribute "English", which is an attribute selected at S82. When the transmission control unit 76 determines that none of the attribute information indicates the selected attribute, the transmission control unit 76 determines that a chat start request is not to be transmitted. Then, the operation ends.

By contrast, when any one of the attribute information indicates the selected attribute, the transmission control unit 76 of the terminal 70x determines that a chat start request is to be transmitted. In response to the determination that a chat request is to be transmitted, the data exchange unit 71 of the terminal 70x transmits a chat start request to the management system 50 (S89-1). This chat start request includes the contact ID "O01" of the terminal 10a as a sender terminal of the presence information, the contact ID "C01" of the own terminal 70x, and the attribute information "en" indicating the attribute selected at S82.

In response to receiving the chat start request transmitted from the terminal 70x, the data exchange unit 51 of the management system 50 transmits this chat start request to the terminal 10a identified by the contact ID "O01" included in the chat start request (S89-2).

Figure 14:
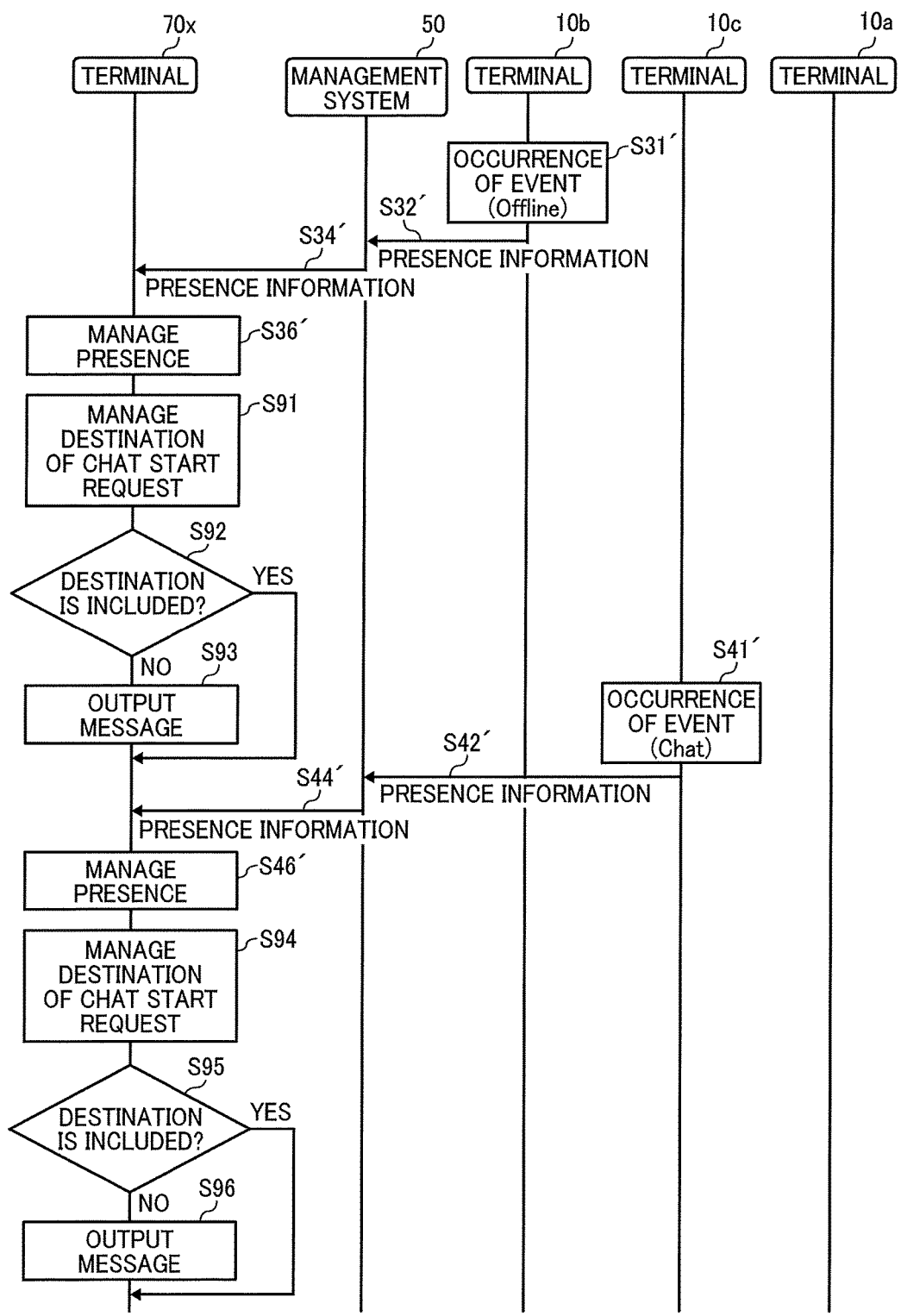
FIG. 14 is a sequence diagram illustrating an example operation of updating a destination of a chat start request, according to an embodiment of the present disclosure.

Hereinafter, a description is given of an operation of updating a destination of a chat start request, performed by the terminal 70x, with reference to FIG. 14. FIG. 14 is a sequence diagram illustrating an example operation of updating a destination of the chat start request.

First, a description is given of an operation performed when an offline process is executed at the terminal 10b, which is a destination of a chat start request. When the operation input acceptor 12 of the terminal 10b accepts an input of offline process (S31'), the data exchange unit 11 transmits the presence information that is read out from the memory 1000 to the management system 50 (S32'). This presence information includes the attribute information "en, es, pt, ru, th", the contact ID "O02" of the terminal 10b, and the presence "Offline".

In response to receiving the presence information from the terminal 10b, the data exchange unit 51 of the management system 50 transmits the received presence information to the terminal 70x on the customer side that has logged in the management system 50 (S34').

The data exchange unit 71 of the terminal 70x receives the presence information from the terminal 10b on the operator side via the management system 50. The data storage/read unit 79 of the terminal 70x stores the contact ID, the presence, and the attribute information, which are included in the received presence information, in association with one another, in the counterpart management table (S36').

When the presence of the terminal 10b is changed to "Offline", it indicates that the terminal 10b is not able to respond to a chat start request from the terminal 70x. Accordingly, the transmission control unit 76 of the terminal 70x updates the destination management table by deleting the contact ID "O02" of the terminal 10b from the destination management table (S91).

The transmission control unit 76 of the terminal 70x determines whether any contact ID of the terminal 10, which is a destination of the chat start request, is stored in the updated destination management table (S92).

When no contact ID of the terminal 10, which is a destination of the chat start request, is stored in the updated destination management table, from which the contact ID "O02" of the terminal 10b from which the presence information is transmitted is deleted (S92: NO), the output control unit 74 controls the display 720 to output a message indicating that connection with an operator has failed (S93). By contrast, when one or more contact ID(s) of the terminal 10, which is a destination of the chat start request, is stored in the updated destination management table, the output control unit 74 does not output the above message. This is because there is a possibility of connecting to the remaining terminal(s) 10, which is a destination of the chat start request.

Next, a description is given of an operation performed when the terminal 10c, which is a destination of the chat start request, starts communication with the terminal 70 different from the terminal 70x. When communication between the terminal 10c and the terminal 70 different from the terminal 70x is established (S41'), the data exchange unit 11 of the terminal 10c transmits the presence information that is read out from the memory 1000 to the management system 50 (S42'). This presence information includes the attribute information "en, ko, pt", the contact ID "O03" of the terminal 10c, and the presence "Chat". In response to receiving the presence information from the terminal 10c, the data exchange unit 51 of the management system 50 transmits the received presence information to the terminal 70x on the customer side that has logged in the management system 50 (S44').

The data exchange unit 71 of the terminal 70x receives the presence information from the terminal 10c on the operator side via the management system 50. The data storage/read unit 79 of the terminal 70x stores the contact ID, the presence, and the attribute information, which are included in the received presence information, in association with one another, in the counterpart management table (S46').

When the presence of the terminal 10c is changed to "Chat", it indicates that the terminal 10c is not able to respond to a chat start request from the terminal 70x. Accordingly, the transmission control unit 76 of the terminal 70x updates the destination management table by deleting the contact ID "O03" of the terminal 10c from the destination management table (S94).

The transmission control unit 76 of the terminal 70x determines whether any contact ID of the terminal 10, which is a destination of the chat start request, is stored in the updated destination management table (S95).

When no contact ID of the terminal 10, which is a destination of the chat start request, is stored in the updated destination management table, from which the contact ID "O03" of the terminal 10c from which the presence information is transmitted is deleted (S95: NO), the output control unit 74 controls the display 720 to output a message indicating that connection with an operator has failed (S96). By contrast, when one or more contact ID(s) of the terminal 10, which is a destination of the chat start request, is stored in the updated destination management table, the output control unit 74 does not output the above message. This is because there is a possibility of connecting to the remaining terminal(s) 10, which is a destination of the chat start request.

Figure 15:
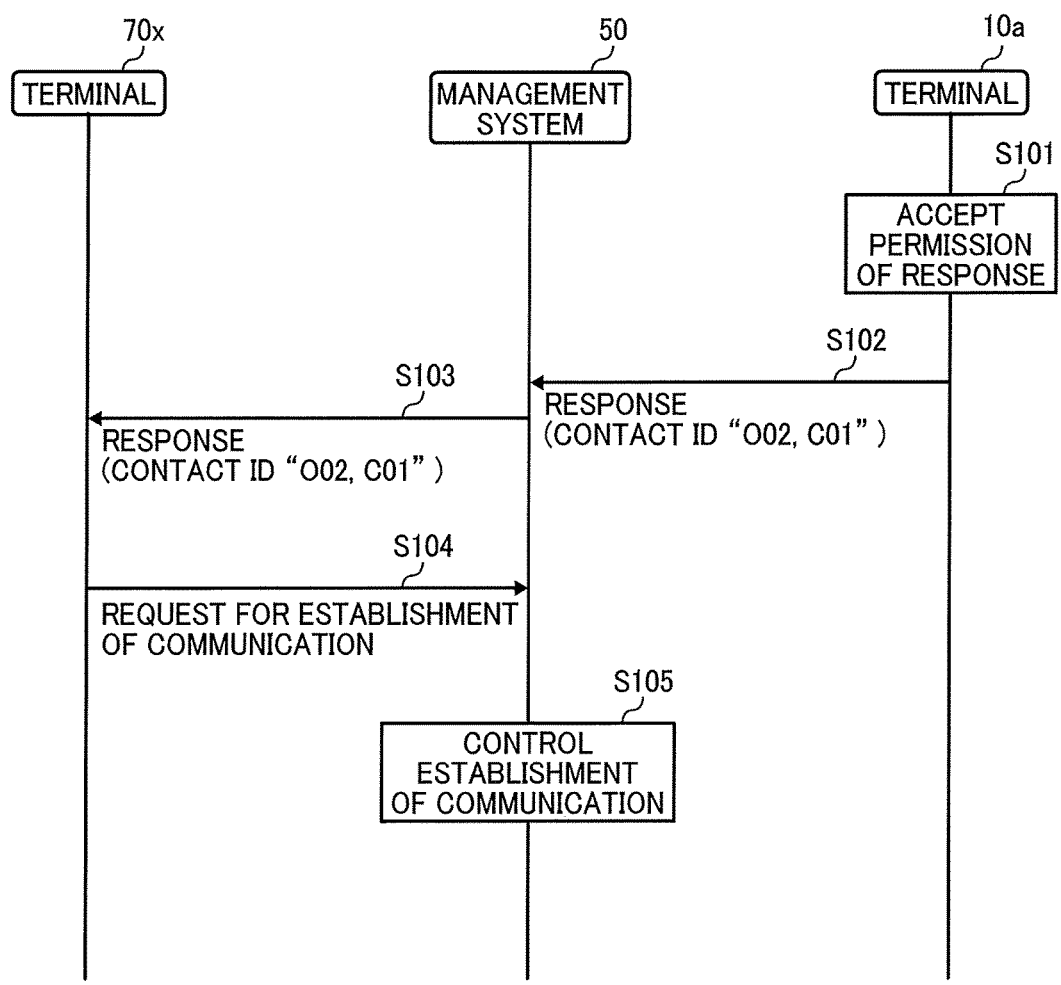
FIG. 15 is a sequence diagram illustrating an example operation of establishing communication between the communication terminals, according to an embodiment of the present disclosure.

Hereinafter, a description is given of an operation of establishing communication between the terminal 10 and the terminal 70, with reference to FIG. 15. FIG. 15 is a sequence diagram illustrating an example operation of establishing communication between the terminal 10 and the terminal 70. In the following, a description is given of an example case in which the terminal 10a responds to a chat start request by the terminal 70x.

Figure 16:
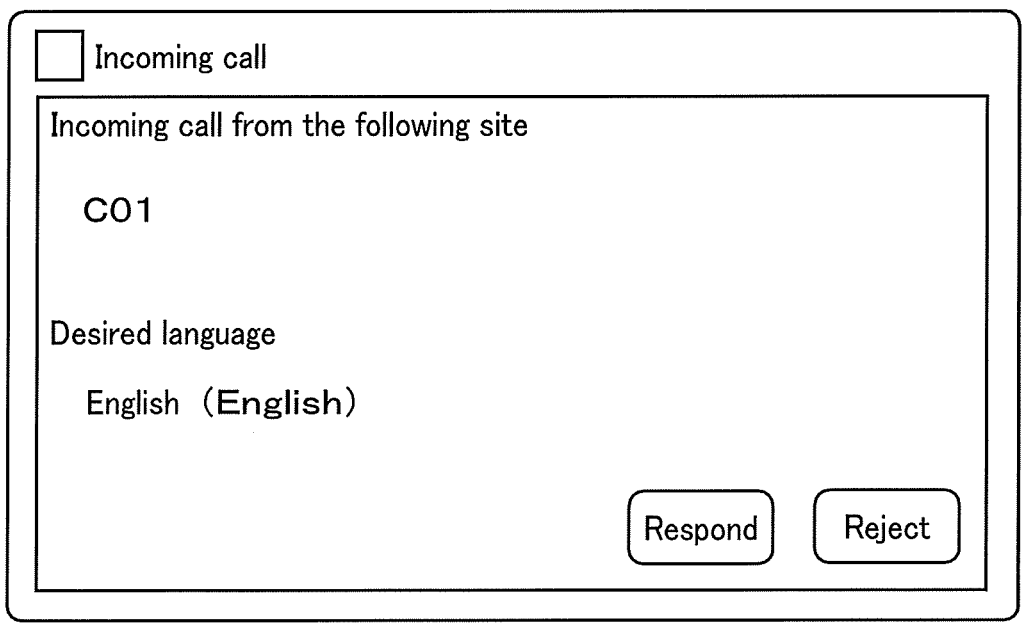
FIG. 16 illustrates an example of a displayed message, according to an embodiment of the present disclosure.

The data exchange unit 11 of the terminal 10a receives a chat start request from the terminal 70 via the management system 50 (S89-2 of FIG. 12). In response to receiving the chat start request, the output control unit 14 of the terminal 10*a* outputs a message to the display 720, the message including information about a request sender corresponding to the contact ID "C01" included in the chat start request, and the attribute "English" corresponding to the attribute information "en" included in the chat start request. FIG. 16 illustrates an example of the displayed message. Since the message includes indication of the attribute, an operator, who is a user of the terminal 10, is able to recognize in which language a chat is to be performed, before starting the chat.

The message illustrated in FIG. 16 includes a respond button for accepting permission to start a chat. When the user (operator) presses the respond button on the screen at the terminal 10*a*, the operation input acceptor 12 receives an operation input of permission to respond to the chat start request (S101). In response to accepting the operation input of permission to respond to the chat start request, the data exchange unit 11 of the terminal 10*a* transmits a response to the management system 50, the response including the contact ID "C01" of the terminal 70*x*, which is a sender terminal of the chat start request, and the contact ID "O01" of the own terminal 10*a* (S102).

The data exchange unit 51 of the management system 50 receives the response from the terminal 10*a*. The data exchange unit 51 of the management system 50 transmits the received response to the terminal 70*x* identified by the contact ID "C01" included in the response (S103).

In response to receiving the response, the data exchange unit 71 of the terminal 70*x* transmits, to the management system 50, a communication establishment request for establishing communication between the terminal 70*x* itself and the terminal 10*a*, which is a sender terminal of the response (S104). This communication establishment request includes the contact ID "C01" of the terminal 70*x* itself, and the contact ID "O01" of the terminal 10*a*, which is a sender terminal of the response.

The management system 50 receives the communication establishment request at the data exchange unit 51. The session control unit 58 of the management system 50 perform control to establish a session that enables the terminal 10*a* and the terminal 70*x* which are identified respectively by the contact ID "O01" and the contact ID "C01" included in the communication establishment request to exchange content data such as image data and audio data with each other via the relay apparatus 30 (S105). The above-described session is just an example, and the session may be a session that enables the terminal 10*a* and the terminal 70*x* to directly exchange content data with each other through the communication network 2. Once the communication is established between the terminal 10*a* and the terminal 70*x*, the terminal 10*a* and the terminal 70 exchange data of an image captured by the own terminal and audio data of sound collected by the own terminal with each other via the relay apparatus 30. The output control unit 14 of the terminal 10*a* and the output control unit 74 of the terminal 70*x* output the received content data. Accordingly, a chat between the users is started.

Although a description is given of an example case in which the attribute is language, any suitable items or information other than language may be selected as the attribute. Examples of the attribute include place names such as "New York, London, Tokyo" indicating a travel destination or a location of real estate, etc., types of products such as "food, clothing items, home electric appliances", and information indicating reservation of conference.

According to the operation of transmitting a chat start request of the above embodiment, the operation input acceptor 72 (an example of circuitry) of the terminal 70 accepts designation of an attribute (an example of an acceptance process). The data exchange unit 71 (an example of the circuitry) of the terminal 70 receives attribute information of a counterpart candidate(s) (an example of a destination candidate) and presence information of the counterpart candidate (an example of a reception process). Based on the received attribute information and presence information, the data exchange unit 71 (an example of the circuitry) of the terminal 70 transmits a first chat start request (an example of a first request) to the counterpart candidate whose attribute information indicates the designated attribute and whose presence information indicates "Online" (an example of a first presence) (an example of transmission process). When the data exchange unit 71 receives attribute information and presence information of a different counterpart candidate, after transmitting the first chat start request by the data exchange unit 71, and when the received attribute information indicates the designated attribute and the received presence information indicates "Online", the data exchange unit 71 of the terminal 70 transmits a second chat start request to the different counterpart candidate. According to this operation, the terminal 70 is able to transmit the second chat start request to the different counterpart candidate from among the counterpart candidates whose attributes are the designated attribute, when the presence of the different counterpart candidate whose presence was not "Online" at the time of transmission of the first chat start request is updated to "Online". Thus, when the terminal 70 designates an attribute and performs transmission, the possibility of receiving a response to the transmission is enhanced.

The destination management DB 7003 (an example of a memory) of the terminal 70 manages one or more contact ID(s) (an example of identification information) of a destination(s) of the chat start request by the data exchange unit 71. When the data exchange unit 71 receives attribute information of the different counterpart candidate other than the destination identified the contact ID managed in the destination management DB 7003 and presence information of the different counterpart candidate, and when the received attribute information indicates the designated attribute and the received presence information indicates "Online", the data exchange unit 71 of the terminal 70 performs transmission to the different candidate counterpart terminal. According to this operation, the terminal 70 determines, based on the information managed in the destination management DB 7003, whether or not a chat start request has been transmitted to the sender terminal of the presence information, and is able to transmit a chat start request depending on the determination result.

When, after transmitting the chat start request to the counterpart candidate by the data exchange unit 71, the data exchange unit 71 receives attribute information of the destination terminal and presence information of the destination terminal, and when the received attribute information indicates the designated attribute and the received presence information indicates "Offline" or "Chat" (an example of a second presence), the transmission control unit 76 of the terminal 70 deletes the contact ID of the destination terminal managed in the destination management DB 7003. This enables the terminal 70 to manage the destination of the chat start request in real time. Accordingly, the terminal 70 is able to accurately determine whether the chat start request has been transmitted to the sender terminal of the presence information.

Once the transmission control unit 76 deletes the contact ID of the destination from the destination management DB 7003, the output control unit 74 (an example of the circuitry) of the terminal 70 controls the display 720 to output information indicating that connection to the destination is not available. Thus, when connection to the destination of the chat start request is no more available, the terminal 70 is able to notify the information.

The presence "Online" indicates a state in which communication with the terminal 70 can be started, and the presence "Offline" or "Chat" indicates a state in which communication with the terminal 70 cannot be started. This enables the terminal 70 to transmit a chat start request to a counterpart candidate at the timing when the counterpart candidate disconnects the previous communication.

The terminal 10 as the counterpart candidate transmits the presence information to the terminal 70 in response to occurrence of a predetermined event as a trigger. This enables the terminal 10 to notify the terminal 70 of the changed presence at the timing when the presence is changed.

<<Supplementary Information on Embodiments>>

The terminal 10, the terminal 70, and the management system 50 according to the embodiment as described above may be configured by a single computer or a plurality of computers to which divided units (functions) are arbitrary allocated.

In the case in which a program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a storage medium storing the terminal control program, the relay apparatus control program, or the communication management program in the above-described communication system 1 according to an embodiment, and the ID 204 storing these programs may be provided in the form of a program product to users with in a certain country or outside that country.

Further, in the above-described communication system 1 according to an embodiment, the terminal management table of FIG. 7E stores the terminal IP address, as terminal identification information. The terminal IP address is just an example, and any suitable terminal identification information such as a fully qualified domain name (FQDN) of each terminal 10 may be managed in the terminal management table, provided that each terminal 10 is identified on the on the communication network 2. In this case, an IP address corresponding to an FQDN is obtained by a Domain Name System (DNS) server.

In the communication system 1 according to an embodiment, the term "videoconference" and the term "teleconference" are interchangeably used.

Note that the terminal 10 may be used not only for communication between different offices or for communication between different rooms in the same office, but also for communication within the same room or for outdoor-indoor communication or outdoor-outdoor communication. In a case in which the terminal 10 is used outside, wireless communication using a mobile phone communication network or the like is performed. In addition, although a description is given of an example case in which a videoconference is held by the communication system 1 in the above-described embodiment, the embodiment is not limited to this case. The communication system 1 may be used in meetings, general conversation between family members or friends, or one-way presentation of information.

According to an embodiment of the present disclosure, when a communication terminal performs transmission while designating an attribute, the possibility of receiving a response to the transmission is enhanced.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform in the recited functions.

What is claimed is:

1. A communication terminal, comprising:
   circuitry configured to:
   accept designation of an attribute,
   receive first attribute information and first presence information of a first destination candidate and second attribute information and second presence information of a second destination candidate;
   transmit a first request to the first destination candidate, the first attribute information indicating the attribute and the first presence information indicating a first presence,
   transmit a second request to the second destination candidate after the circuitry determines that the second attribute information indicates the attribute and the second presence information indicates the first presence,
   receive, after the circuitry transmits the second request, third attribute information and third presence information of a third destination candidate in response to the third destination candidate satisfying a condition that was not satisfied at a time of transmitting the second request, the third destination candidate being different than the first destination candidate and the second destination candidate,
   determine whether the third attribute information indicates the attribute, and
   transmit, in response to determining that the third attribute information indicates the attribute, a third request to the third destination candidate.

2. The communication terminal of claim 1, further comprising:
   a memory to store identification information of the first destination candidate, wherein
   the second destination candidate is different from the first destination candidate.

3. The communication terminal of claim 2, wherein in response to receiving the first attribute information and the second presence information after the transmission of the first request, the circuitry deletes the identification information of the first destination candidate from the memory based on the circuitry determining that the attribute information of the first destination candidate indicates the attribute and the first presence information indicates a second presence.

4. The communication terminal of claim 3, wherein the circuitry outputs information indicating that connection with the first destination candidate, in which the identification information is deleted from the memory, is not available.

5. The communication terminal of claim 3, wherein
the first presence indicates a state in which communication with the communication terminal can be started, and
the second presence indicates a state in which communication with the communication terminal cannot be started.

6. A communication system, comprising:
a first communication terminal; and
a second communication terminal as a destination candidate to which the first communication terminal transmits a request, wherein
the first communication terminal includes circuitry to:
    accept designation of an attribute,
    receive first attribute information and first presence information of a first destination candidate and second attribute information and second presence information of a second destination candidate,
    transmit a first request to the first destination candidate, the first attribute information indicating the attribute and the first presence information indicating a first presence,
    transmit a second request to the second destination candidate after the circuitry determines that the second attribute information indicates the attribute and the second presence information indicates the first presence,
    receive, after the circuitry transmits the second request, third attribute information and third presence information of a third destination candidate in response to the third destination candidate satisfying a condition that was not satisfied at a time of transmitting the second request, the third destination candidate being different than the first destination candidate and the second destination candidate,
    determine whether the third attribute information indicates the attribute, and
    transmit, in response to determining that the third attribute information indicates the attribute, a third request to the third destination candidate.

7. The communication system of claim 6, wherein the second communication terminal transmits presence information to the first communication terminal in response to occurrence of a predetermined event as a trigger.

8. A communication method comprising:
accepting designation of an attribute;
receiving first attribute information and first presence information of a first destination candidate and second attribute information and second presence information of a second destination candidate;
transmitting a first request to the first destination candidate, the first attribute information indicating the attribute and the first presence information indicating a first presence;
transmitting a second request to the second destination candidate after determining that the second attribute information indicates the attribute and the second presence information indicates the first presence;
receiving, after transmitting the second request, third attribute information and third presence information of a third destination candidate in response to the third destination candidate satisfying a condition that was not satisfied at a time of transmitting the second request, the third destination candidate being different than the first destination candidate and the second destination candidate;
determining whether the third attribute information indicates the attribute; and
transmitting, in response to determining that the third attribute information indicates the attribute, a third request to the third destination candidate.

9. The communication method of claim 8, wherein each destination candidate transmits respective presence information in response to occurrence of a predetermined event as a trigger.

10. A non-transitory computer-readable storage medium storing a computer-executable product that causes a communication terminal to perform a communication method comprising:
accepting designation of an attribute;
receiving first attribute information and first presence information of a first destination candidate and second attribute information and second presence information of a second destination candidate;
transmitting a first request to the first destination candidate, the first attribute information indicating the attribute and the first presence information indicating a first presence;
transmitting a second request to the second destination candidate after determining that the second attribute information indicates the attribute and the second presence information indicates the first presence;
receiving, after transmitting the second request, third attribute information and third presence information of a third destination candidate in response to the third destination candidate satisfying a condition that was not satisfied at a time of transmitting the second request, the third destination candidate being different than the first destination candidate and the second destination candidate;
determining whether the third attribute information indicates the attribute;
transmitting, in response to determining that the third attribute information indicates the attribute, a third request to the third destination candidate.

11. The communication terminal of claim 1, wherein the circuitry transmits the third request to the third destination candidate only in response to determining that the third attribute information indicates the attribute and the third destination candidate satisfying the condition that was not satisfied at the time of transmitting the second request.

* * * * *